(12) United States Patent
Uehara

(10) Patent No.: US 8,880,289 B2
(45) Date of Patent: Nov. 4, 2014

(54) VEHICLE MANEUVER APPLICATION INTERFACE

(75) Inventor: Yasuo Uehara, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 742 days.

(21) Appl. No.: 13/050,283

(22) Filed: Mar. 17, 2011

(65) Prior Publication Data

US 2012/0239242 A1  Sep. 20, 2012

(51) Int. Cl.
*G06F 7/00* (2006.01)
*B60W 50/00* (2006.01)
*G06F 9/445* (2006.01)

(52) U.S. Cl.
CPC ........ *G06F 8/62* (2013.01); *B60W 50/00* (2013.01); *B60W 2050/0095* (2013.01); *G06F 8/61* (2013.01); *G06F 9/445* (2013.01); *G06F 8/65* (2013.01)
USPC .......................................................... 701/36

(58) Field of Classification Search
None
See application file for complete search history.

(56) References Cited

U.S. PATENT DOCUMENTS

| | | | |
|---|---|---|---|
| 5,521,588 A | 5/1996 | Kuhner et al. | |
| 6,512,970 B1 | 1/2003 | Albert | |
| 6,647,324 B2 | 11/2003 | Creutzburg et al. | |
| 6,850,823 B2 | 2/2005 | Eun et al. | |
| 6,931,309 B2 | 8/2005 | Phelan et al. | |
| 7,056,185 B1 | 6/2006 | Anagnostou | |
| 7,133,756 B2 | 11/2006 | Jammu et al. | |
| 7,275,181 B2 | 9/2007 | Staiger | |
| 7,391,339 B2 | 6/2008 | Howard et al. | |
| 7,418,345 B2 | 8/2008 | Diebold et al. | |
| 7,500,151 B2 | 3/2009 | Englert et al. | |
| 7,522,979 B2 | 4/2009 | Pillar | |
| 7,558,661 B2 | 7/2009 | Sundaram et al. | |
| 7,558,771 B2 | 7/2009 | Barajas et al. | |
| 7,706,936 B2 | 4/2010 | Krzystofczyk et al. | |
| 7,778,739 B2 | 8/2010 | Preston et al. | |
| 8,392,104 B2* | 3/2013 | Nishira et al. | 701/301 |

(Continued)

FOREIGN PATENT DOCUMENTS

| | | |
|---|---|---|
| EP | 1614585 | 1/2006 |
| JP | 9-288573 | 11/1997 |
| JP | 2004-005506 | 1/2004 |
| WO | WO 86-03132 | 6/1986 |

OTHER PUBLICATIONS

Weisser, Hubert et al.; "Autonomous Driving on Vehicle Test Tracks: Overview, Implementation and Vehicle Diagnosis"; *IEEE*; pp. 62-67; 1999.

*Primary Examiner* — Thomas Tarcza
*Assistant Examiner* — Adam Alharbi
(74) *Attorney, Agent, or Firm* — Snell & Wilmer LLP

(57) ABSTRACT

A vehicle maneuver application (VMA) interface, and a VMA interface system software being executed thereon, may be used for installing, modifying, uninstalling, activating, and/or deactivating one or more VMAs. The VMA interface may include an interface processor and an interface memory. The interface processor may be configured to install the VMA to the VMA device upon receiving an installation signal, update the installed VMA upon receiving an update signal, uninstalling the installed VMA upon receiving an uninstallation signal, activating the installed VMA upon receiving an activation signal, and/or deactivating the installed VMA upon receiving a deactivation signal. The interface memory may be coupled to the interface processor, and it may be configured to store a VMA execution record related to the installed VMA.

22 Claims, 12 Drawing Sheets

(56) References Cited

U.S. PATENT DOCUMENTS

| | | |
|---|---|---|
| 2002/0111794 A1 | 8/2002 | Yamamoto et al. |
| 2005/0071368 A1 | 3/2005 | Kim et al. |
| 2005/0097541 A1 | 5/2005 | Holland |
| 2005/0180462 A1 | 8/2005 | Yi |
| 2005/0267761 A1 | 12/2005 | Ueno |
| 2006/0184295 A1 | 8/2006 | Hawkins et al. |
| 2006/0265731 A1 | 11/2006 | Matsuda |
| 2006/0271255 A1 | 11/2006 | Stott et al. |
| 2006/0293811 A1 | 12/2006 | Andreasen et al. |
| 2007/0011012 A1 | 1/2007 | Yurick et al. |
| 2007/0135990 A1 | 6/2007 | Seymour et al. |
| 2008/0049150 A1 | 2/2008 | Herbin et al. |
| 2009/0082918 A1 | 3/2009 | Hendrix, Jr. |
| 2009/0146842 A1 | 6/2009 | Jung |
| 2009/0157311 A1* | 6/2009 | Seltzer et al. .................. 701/210 |
| 2010/0096905 A1 | 4/2010 | Takenaka et al. |
| 2010/0235035 A1* | 9/2010 | Nishira et al. .................. 701/29 |

* cited by examiner

VEHICLE MANEUVER APPLICATION INTERFACE

BACKGROUND

1. Field

The present invention generally relates to the field of vehicle maneuver control system, and more particularly to a vehicle maneuver application interface.

2. Description of the Related Art

Recently, motor vehicles are installed with one or more vehicle maneuver applications (VMAs), such as a collision avoidance application or a parking assistance application. According to the industrial practice, VMAs are typically pre-installed and tested by the manufacturer of the motor vehicle. A driver may activate or deactivate a preinstalled VMA by using a built-in VMA interface. These VMAs are designed to help a driver to control the movement of a motor vehicle. As such, these VMAs may allow a driver to operate a motor vehicle in a safer, more convenient, and more efficient manner.

As the driving skill, driving habit and preference of a driver changes over time, the amount and types of assistance for the driver may change as well. Accordingly, the driver may want to install newly developed VMAs, modify the pre-installed VMAs, and/or replace the already-installed VMAs. However, conventional VMA interfaces may lack the option for installing post-manufacturing VMAs. Moreover, conventional VMA interfaces may lack the option for upgrading, modifying, or removing any already installed VMAs.

Thus, there is a need for a VMA interface with improved flexibility and capabilities.

SUMMARY

Several embodiments of the present invention may provide a vehicle maneuver application (VMA) interface and VMA interface system software. The VMA interface and the VMA interface system software may be used for installing, modifying, uninstalling, activating and/or deactivating one or more VMAs.

In one embodiment, the present invention may provide a non-transitory storage medium storing instructions that when executed by a processor, cause the processor to perform a method for handling one or more vehicle maneuver applications (VMAs) for use in a motor vehicle, the method may comprise the steps of initiating a VMA device, detecting an installation signal or data, receiving a VMA from a VMA source, and in response to the detected installation signal or data, installing the received VMA in a memory configured to be coupled to the processor.

In another embodiment, the present invention may provide a non-transitory storage medium storing instructions that when executed by a processor, cause the processor to perform a method for activating with one or more vehicle maneuver applications (VMAs) for use in a motor vehicle, the method may comprises the steps of detecting a VMA activation signal, in response to the detected VMA activation signal, selecting a VMA to be activated, retrieving vehicle data from a vehicle data logger, the vehicle data containing information related to a condition of the motor vehicle, initializing the selected VMA with the retrieved vehicle data, and interfacing the initialized VMA with a vehicle maneuver controller, the vehicle maneuver controller configured to control a movement of the motor vehicle.

In yet another embodiment, the present invention may provide a vehicle maneuver application (VMA) system for use in a motor vehicle. The VMA system may include a VMA device configured to store and execute a VMA, an interface processor coupled to the VMA device, the interface configured to install the VMA to the VMA device upon receiving an installation signal, update the installed VMA upon receiving an update signal, and uninstalling the installed VMA upon receiving an uninstallation signal, and a vehicle maneuver controller coupled to the interface processor, the vehicle maneuver controller configured to control the movement of the motor vehicle, the vehicle maneuver controller configured to establish a connection with the VMA device when the installed VMA is activated.

This summary is provided merely to introduce certain concepts and not to identify any key or essential features of the claimed subject matter.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Apparatus, systems and methods that implement the embodiment of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between reference elements. In addition, the first digit of each reference number indicates the figure in which the element first appears.

Figure 1:
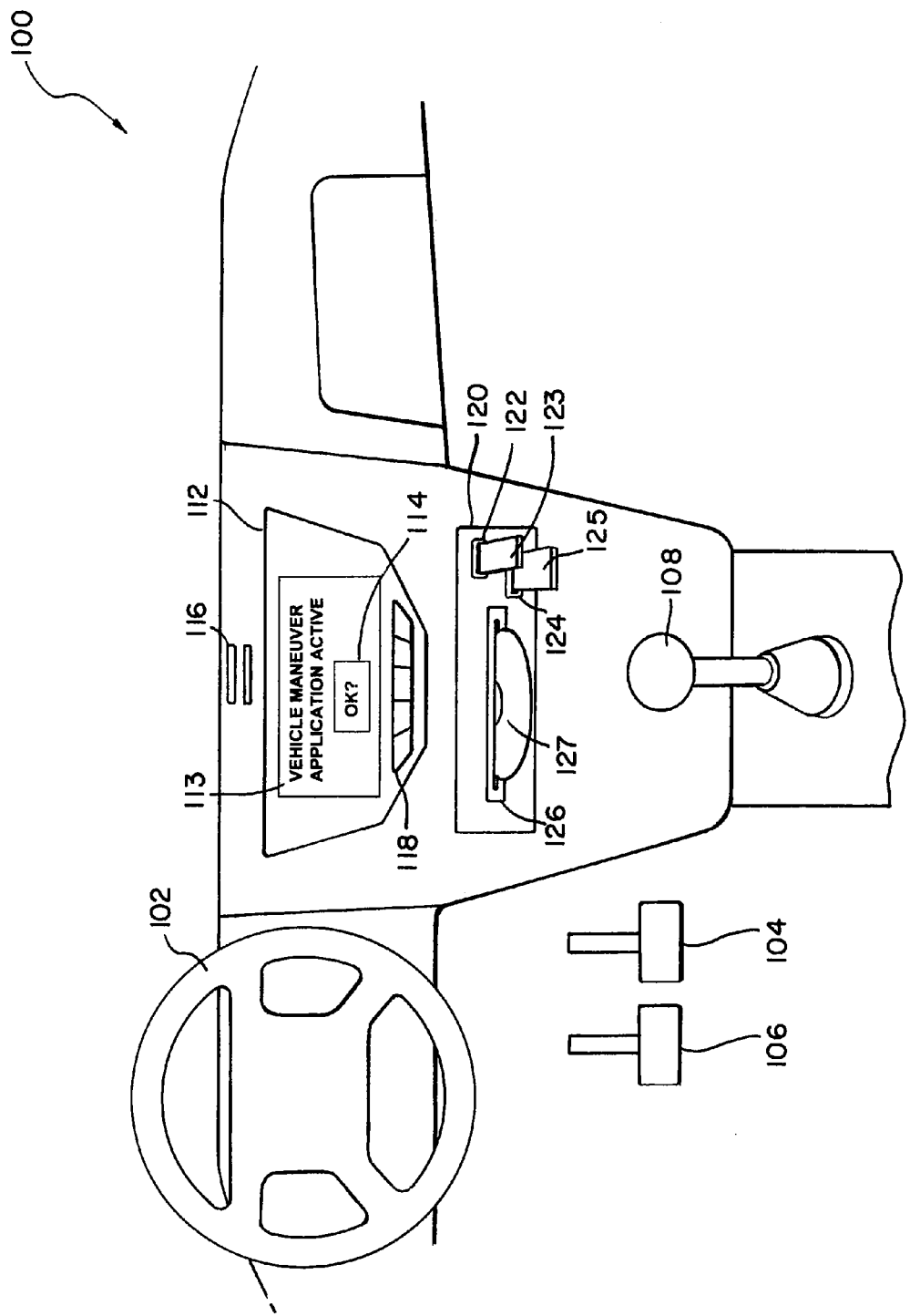
FIG. 1 shows an interior view of a motor vehicle with a vehicle maneuver application (VMA) interface according to an embodiment of the present invention.

FIG. 1 shows an interior view of a motor vehicle 100 with a vehicle maneuver application (VMA) interface according to an embodiment of the present invention. Generally, the VMA interface may be used for installing, updating, executing, and/or removing one or more vehicle maneuver applications (VMAs). A VMA may be a set of software instructions or codes that, when executed by a vehicle maneuver device, cause the vehicle maneuver application device to perform a method for controlling the movement of a motor vehicle. For example, the VMA may include an adaptive cruise control application, a lane following application, a lane changing application, a crash avoidance application, an automatic parking application, an autonomous driving application, and/or a remote driving application. When a VMA is being executed, the motor vehicle 100 may be operated with less human intervention.

The motor vehicle 100 may also include several vehicle maneuver (VM) input devices. When the VMA is not activated, or when a driver decides to override the activated VMA, the several VM input devices may allow the driver to control the movement of the motor vehicle 100. In one embodiment, for example, the VM input devices may include a steering wheel 102 for steering the motor vehicle 100; a gas pedal 104 for accelerating the motor vehicle 100; a brake pedal 106 for decelerating the motor vehicle 100; and a gear shifting device 108 for shifting the gears of the motor vehicle 100.

The motor vehicle 100 may have a VMA input device 120, which may be used for receiving a VMA being stored in a physical medium. In one embodiment, for example, the VMA input device 120 may include a Universal Serial Bus (USB) reader 122 for reading the content of a USB drive 123 or a storage device (not shown) with a USB output port, a FLASH memory card reader 124 for reading the content of a FLASH memory card 125, and a Compact Disc (CD) reader 126 for reading the content of a CD 127.

The motor vehicle 100 may include several operator input and/or output devices, which may allow a driver to interact with the VMA interface. In one embodiment, for example, the motor vehicle 100 may include a touch-sensitive screen display 112, which may be used for displaying VMA messages 113 generated by the VMA interface and/or receiving VMA inputs 114 for the VMA interface. In another embodiment, for example, the motor vehicle 100 may include an integrated microphone-speaker 116, which may be used for delivering audio output generated by the VMA interface and receiving voice commands for the VMA interface. In yet another embodiment, the motor vehicle 100 may include a set of sensors 118, which may be used for receiving input for the VMA interface. The set of sensors 118 may include one or more touch sensors, proximity sensors, compression sensors, and/or optical sensors.

Figure 2:
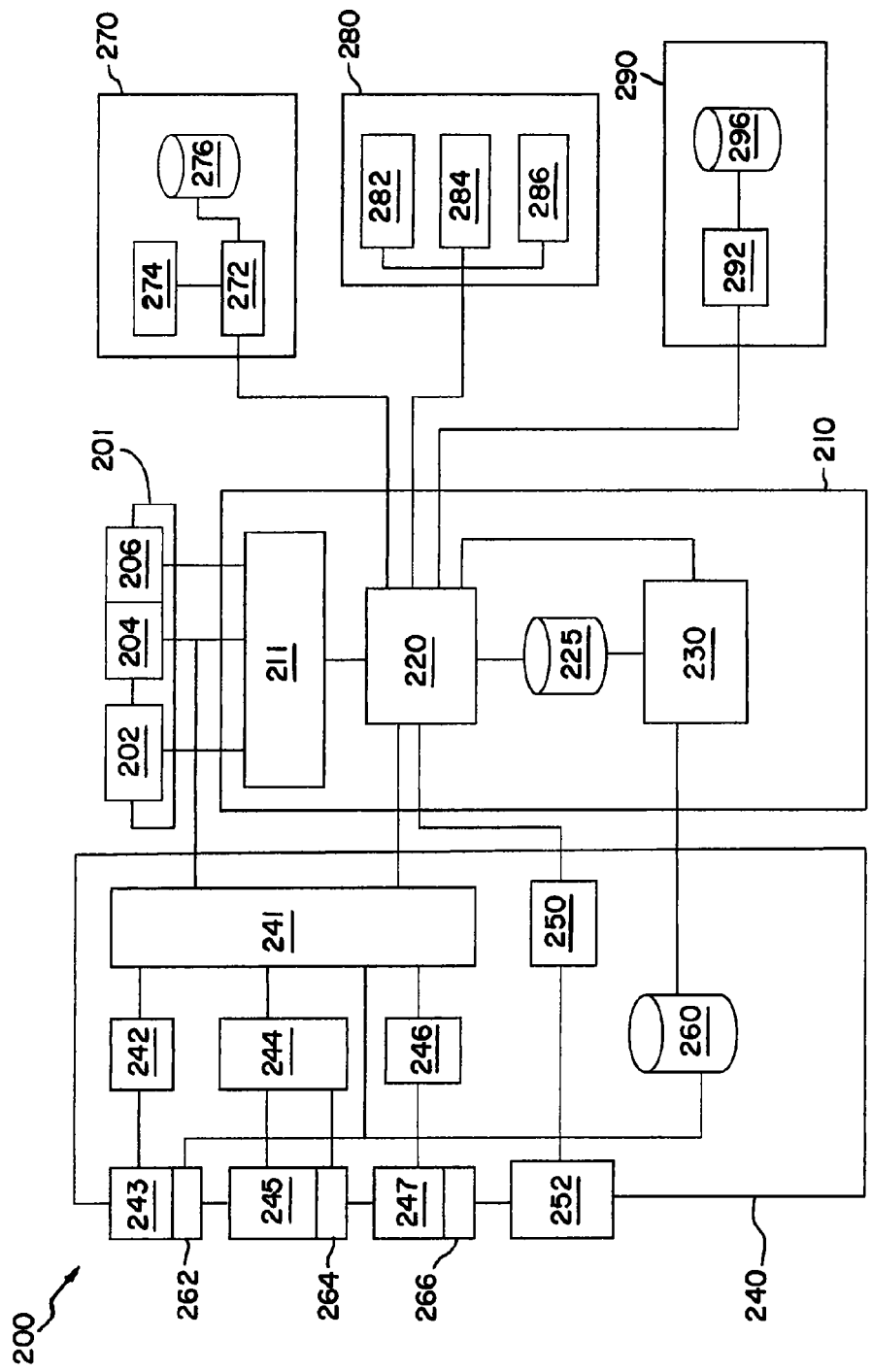
FIG. 2 shows a system block diagram of a vehicle control system according to an embodiment of the present invention.

FIG. 2 shows a system block diagram of a vehicle control system 200 according to an embodiment of the present invention. Generally, the vehicle control system 200 may be an electro-mechanical system that is embedded in the motor vehicle 100, and it may be used for performing one or more functions of the motor vehicle 100. In one embodiment, the vehicle control system 200 may be used for performing functions that are related to the movement of a motor vehicle 100, which may include steering, acceleration, and deceleration. In another embodiment, the vehicle control system 200 may optionally be used for performing functions that are unrelated to the movement of a motor vehicle 100, which may include temperature control and navigation assistance.

The vehicle control system 200 may include an input-output (I/O) block 201, a vehicle maneuver application (VMA) interface 210, a vehicle system 240, a VMA device 270, a wireless network device 280, and optionally, an auxiliary application device 290. The I/O block 201 may be used for communicating and interacting with an operator, such as a driver. The vehicle system 240 may perform the movement-related and/or movement-unrelated functions of the vehicle control system 200. The VMA device 270 may be used for storing and executing one or more VMAs. A VMA, when being executed by the VMA interface 210, may control the vehicle system 240 for performing the movement-related functions. The auxiliary application device 290 may be used for storing and executing one or more auxiliary applications, which when executed, may control the vehicle system 240 for performing the movement-unrelated functions. The wireless network device 280 may be used for wirelessly connecting the vehicle control system 200 to one or more wireless networks.

The I/O block 201 may have an operator I/O sub-block 202, a vehicle maneuver input sub-block 204, and a VMA input sub-block 206. The operator I/O sub-block 202 may include I/O devices that allow a driver to communicate and interact with the VMA interface 210. For example, the I/O devices may be the set of sensors 118, the touched-sensitive display screen 112, and/or the integrated microphone-speaker 116 as shown in FIG. 1. The vehicle maneuver input sub-block 204 may include vehicle maneuver input devices that may allow a driver to access and control the vehicle system 240. For example, the vehicle maneuver input devices may be the steering wheel 102, the gas pedal 104, the brake pedal 106, and the gear shifting device 108 as shown in FIG. 1. The VMA input, sub-block 206 may include VMA input devices for receiving a VMA from a physical storage medium. For example, the VMA input devices may be the USB reader 122, the FLASH memory card reader 124, and the CD reader 126 as shown in FIG. 1.

The VMA interface 210 may include an I/0 driver 211, an interface processor 220, an interface memory 225, and a diagnosis processor 230. The I/O driver 211 may be used for formatting the inputs received from the operator I/O sub-block 202, vehicle maneuver input sub-block 204, and the VMA input sub-block 206, such that the formatted inputs may be processed by the interface processor 220.

Internal to the VMA interface 210, the interface processor 220 may be coupled to the I/O driver 211, the interface memory 225, and the diagnosis processor 230. External to the VMA interface 210, the interface processor 220 may be coupled to the vehicle system 240, the VMA device 270, the auxiliary application device 290, and the wireless network device 280. In one embodiment, the interface processor 220 may establish one or more wired connections with the VMA device 270, the auxiliary application device 290 and/or the wireless network device 280. In another embodiment, the interface processor 220 may establish one or more wireless connections with the VMA device 270, the auxiliary application device 290 and/or the wireless network device 280.

The interface processor 220 may be configured to receive and install one or more VMAs in the VMA device 270. The interface processor 220 may initiate the installation process upon receiving an installation command from the operator I/O sub-block 202. After the installation process is initiated, the interface processor 220 may receive a VMA from the VMA input block 206 and/or from a remote network (not shown) and/or a remote server (not shown) via the wireless network device 280. Initially, the interface processor 220 may determine whether the newly received VMA is fit for use in a particular motor vehicle. The interface processor 220 may ascertain the compatibility of the received VMA and ensure that the received VMA has met the industrial standard.

The interface processor 220 may verify the quality of the received VMA by using various encryption techniques. For example, after passing the necessary quality test, a VMA may be certified by a certifying agent. The certifying agent can be a motor vehicle manufacturer, a VMA developer, and/or a neutral third party. The neutral third party may be an entity that is not related to the motor vehicle manufacturer and/or the VMA developer. The neutral third party may embed encrypted data to the certified VMA. The encrypted data may be pertinent to the compatibility information, safety features, and quality of the VMA. The interface processor 220 may use a decryption key to decrypt the encrypted data. The decryption key may be assigned to the interface processor 220 by the neutral third party. Alternatively, the interface processor 220 may retrieve an updated decryption key from a remote network and/or a remote server via the wireless network device 280.

If the received VMA does not pass the verification process, the interface processor 220 may terminate the installation process. The interface processor 220 may generate an output message, which may be presented to the operator via the operator I/O sub-block 202. The output message may notify the operator that the VMA will not be installed because it is incompatible with the particular motor vehicle, or because it is not yet certified. If the received VMA passes the verification process, the interface processor 220 may continue the installation process, and it may send a check-space request to the VMA device 270.

The VMA device 270 may include a VMA processor 272, a VMA sensor 274, and a VMA memory 276. The VMA processor 272 may be coupled to the interface processor 220, and the VMA memory 276 may be coupled to the VMA processor 272. After receiving the check-space request from the interface processor 220, the VMA processor 272 may check the VMA memory 276 for available space. If the VMA memory 276 runs out of space, the VMA processor 272 may send an insufficient-space signal to the interface processor 220 to signify that the newly received VMA will not be installed. After receiving the insufficient-space signal, the interface processor 220 may terminate the installation process, and it may generate an output message, which may be presented to the operator, via the operator I/O sub-block 202. The output message may inform the operator that the VMA will not be installed because the VMA memory 276 does not have sufficient space.

On the other hand, if the VMA memory 276 has sufficient space for installing the received VMA, the VMA processor 272 may send a sufficient-space signal to the interface processor 220. In response to the sufficient-space signal, the interface processor 220 may transmit the newly received VMA to the VMA processor 272. The VMA processor 272 may, in return, register the received VMA, store the registered VMA to the VMA memory 276, and send an installation-completion signal to the interface processor 220. Upon receiving the installation-completion signal, the interface processor 220 may generate an output message, which may be presented to the operator via the operator I/O sub-block 202. The output message may inform the operator that the installation process is completed.

The interface processor 220 may be configured to update and/or modify one or more installed VMAs, which may be stored in the VMA memory 276. The interface processor 220 may periodically, iteratively, repeatedly, and/or randomly searching for update information related to the already installed VMAs. For example, the interface processor 220 may probe for update information on one or more remote networks and/or remote servers. In another example, the interface processor 220 may detect the update information stored in a storage media, which may be retrieved by the VMA input sub-block 206.

Once the interface processor 220 identifies the updated information, it may initiate the update process. The interface processor 220 may generate a notification message via the operator I/O sub-block 202. The notification message may notify an operator that an update is available for one or more installed VMAs. Moreover, the interface processor 220 may generate an update request via the operator I/O sub-block 202. The update request may be either accepted or declined. If the operator declines the update request, the update process will be terminated. If the operator accepts the update request, the I/O sub-block 202 may generate an update command, which may be received by the interface processor 220.

Upon receiving the update command or request, the interface processor 220 may retrieve the updating content (or modification content). For example, the interface processor 220 may retrieve the updating content from one or more remote networks and/or remote servers via the wireless network device 280. In another example, the interface processor 220 may retrieve the updating content from one or more physical storage media via the VMA input block 206.

Once the updating content is retrieved, the interface processor 220 may determine whether the newly retrieved updating content is fit for used in a particular motor vehicle. The interface processor 220 may ascertain the compatibility of the updating content and ensure that the updating content has met the industrial standard. The interface processor 220 may verify the quality of the updating content by using various encryption techniques. For example, the interface processor 220 may perform a verification process that is similar to the one performed in the installation process.

If the received updating content does not pass the verification process, the interface processor 220 may terminate the update process. The interface processor 220 may generate an output message, which may be presented to the operator via the operator I/O sub-block 202. The output message may notify the operator that the updating process will not be performed because the updating content is incompatible with the particular motor vehicle, or because the updating content is not yet certified. If the updating content passes the verification process, the interface processor 220 may continue the installation process, and it may send a check-space request to the VMA device 270.

After receiving the check-space request from the interface processor 220, the VMA processor 272 may check the VMA memory 276 for available space. If the VMA memory 276 runs out of space, the VMA processor 272 may send an insufficient-space signal to the interface processor 220 to signify the updating content will not be installed. After receiving the insufficient-space signal, the interface processor 220 may terminate the update process, and it may generate an output message, which may be presented to the operator, via the operator I/O sub-block 202. The output message may inform the operator that the updating content will not be installed because the VMA memory 276 does not have sufficient space.

On the other hand, if the VMA memory 276 has sufficient space for the updating content, the VMA processor 272 may send a sufficient-space signal to the interface processor 220. In response to the sufficient-space signal, the interface processor 220 may transmit the updating content to the VMA processor 272. The VMA processor 272 may, in return, re-register the to-be-updated VMA (e.g. a target VMA), integrate the updating content to the target VMA, store the integrated VMA to the VMA memory 276, and send an update-completion signal to the interface processor 220. Upon receiving the update-completion signal, the interface processor 220 may generate an output message, which may be presented to the operator via the operator I/O sub-block 202. The output message may inform the operator that the update process is completed.

The interface processor 220 may be configured to uninstall, delete, and/or remove one or more installed VMAs. At any point after a VMA is successfully installed and/or updated, an operator may decide to uninstall, delete, and/or remove the VMA being stored in the VMA memory 276. Upon receiving a request from the operator via the operator I/O sub-block 202, the interface processor 220 may generate a VMA menu, which may be presented to the operator via the operator I/O sub-block 202. The operator may select an uninstallation function from the menu. After the uninstallation function is invoked, the interface processor 220 may provide a list of installed VMAs to the operator. The operator may then select one or more VMAs to be uninstalled, upon which an uninstall command may be generated by the operator I/O sub-block 202.

After receiving the uninstall command, the interface processor 220 may perform a system check. The system check may ascertain whether the requested uninstallation will disrupt or corrupt the unselected VMAs. For example, the interface processor 220 may determine whether the parameters, which may be stored in the interface memory 225, of the unselected VMAs may depend on or be affected by the to-be-uninstalled VMAs. In another example, the interface processor 220 may request the VMA processor 272 to perform a VMA integrity check. In response, the VMA processor 272 may determine whether uninstalling the selected VMA may corrupt the codes of the unselected VMAs.

If the uninstallation process is likely to disrupt or corrupt the unselected VMAs, the interface processor 220 may decline the uninstallation, or alternatively, request an approval or an amendment kit from a certified agent. In the event that the interface processor 220 decline the uninstallation, an abort message may be presented to the operator via the operator I/O sub-block 202. The abort message may request the operator to obtain a certified approval and/or amendment kit from a certified agent, which may include the VMA developer, the motor vehicle manufacturer, and/or a neutral third party. If the uninstallation process is unlikely to disrupt or corrupt the unselected VMAs, or if the uninstallation process is approved and/or an amendment kit is available for the uninstallation process, the interface processor 220 may continue the system check.

The system check may also ascertain whether the uninstallation will negatively impact the functionalities of the vehicle system 240. For example, the interface processor 220 may request the diagnosis processor 230 to perform a functionality check. In response, the diagnosis processor 230 may analyze the data stored in a vehicle data logger 260 and the interface memory 225. Based on the analysis, the diagnosis processor 230 may determine whether uninstalling the selected VMA may disrupt, remove, or inadvertently retard one or more functionalities of the vehicle system 240.

If the uninstallation process is likely to disrupt, remove, or inadvertently retard one or more functionalities of the vehicle system 240, the interface processor 220 may decline the uninstallation and generate an abort message, which may be presented to the operator via the operator I/O sub-block 202. The abort message may inform the operator that the uninstallation will not be performed and provide the operator with a summary of the functionality check. If the uninstallation process is likely to disrupt, remove, or inadvertently retard one or more functionalities of the vehicle system 240, the interface processor 220 may send an uninstallation signal to the VMA processor 272.

In response to the uninstallation signal, the VMA processor 272 may un-register the selected VMA and/or delete the target VMA from the VMA memory 276. The VMA processor 272 may send an uninstall-completion signal to the interface processor 220 once the selected VMA is removed. The interface processor 220 may remove, from the interface memory 225, registration records, execution records, and/or parameters pertinent to the uninstalled VMA. Upon receiving the uninstall-completion signal, the interface processor 220 may generate an output message, which may be presented to the operator via the operator I/O sub-block 202. The output message may inform the operator that the uninstall process is completed.

The VMA interface 210 may provide a convenient platform for an operator to add, modify, and/or remove VMAs. In addition to the pre-installed VMAs, an operator may obtain newly developed and certified VMAs from various developers. For example, the operator may purchase a certified VMA stored in a USB drive, CD, or FLASH memory card. In another example, the operator may purchase a certified VMA via a mobile device, such as a cellular phone and/or a laptop computer, and then transfer the purchased VMA from the mobile device to the interface processor 220. In another example, the operator may access one or more remote networks via the wireless network device 280 and purchase a certified VMA from an online store.

The wireless network device 280 may include one or more transceivers. In one embodiment, for example, the wireless network device 280 may include a short range transceiver 282, such as a dedicated short-range communication (DSRC) transceiver. In another embodiment, for example, the wireless network device 280 may include a medium range transceiver 284, such as a blue-tooth transceiver, an infrared (IR) transceiver, a radio frequency (RF) transceiver, and/or an IEEE 802.11 transceiver. In yet another embodiment, for example, the wireless network device 280 may include a long range transceiver 286, such as a global system for mobile communications (GSM) transceiver and/or a code division multiples access (CDMA) transceiver.

Accordingly, the VMA interface 210 may access various networks, which may include, but is not limited to, a peer-to-peer network, a local area network, a wide area network, a public network, a private network, and/or a virtual private network. Advantageously, the VMA interface 210 may provide the operator with a high degree of flexibility in selecting a wide variety of VMAs, while ensuring the newly developed VMAs are compatible and safe to use. Moreover, an authorized third party operator may remotely access the interface processor 220 via the wireless network device 280. As such, the authorized third party operator may remotely maneuver the vehicle control system 200. This feature may be beneficial when the driver is temporarily disabled or when the vehicle maneuver input sub-block 204 malfunctions.

After a VMA is installed, the interface processor 220 may be used for activating the installed VMA. The interface processor 220 may present a VMA activation menu via the operator I/O sub-block 202. An operator may select, from the VMA activation menu, one or more installed VMAs to be activated. After the selection is made, the operator I/O sub-block 202 may send an initiation signal (a.k.a. activation signal) to the interface processor 220. The initiation signal may be embedded with various data. For example, the initiation signal may be embedded with an identifier that identifies the selected WMA and/or a priority code that indicates the operation priority of the selected WMA.

The interface processor 220 may process the initiation signal, and in response, it may command the VMA processor 272 to execute the selected VMA. The VMA processor 272 may locate and load the selected VMA from the VMA memory 276. While initiating the selected VMA, the VMA processor 272 may send a vehicle data request signal to the interface processor 220. The VMA may utilize current vehicle data as parameters for initialization and/or calibration.

Generally, vehicle data may contain information related to the physical conditions of the motor vehicle. For example, vehicle data may contain information related to the rotation speed of each tire, the air pressure of each tire, the amount of brake fluid, the conditions of each brake pad, the normal force received by each tire, the working conditions of various lighting devices, the amount of gas, and/or the torque received by each of the front wheels. Moreover, vehicle data may contain information related to the conditions by which the motor vehicle is surrounded. For example, vehicle data may contain information related to the relative speed of one or more adjacent (e.g., front, back, left, and/or right sides) motor vehicles, the relative distance of one or more adjacent motor vehicles, the status of one or more adjacent traffic lights, the position of the motor vehicle with respect to one or more driving lanes, and/or the traction of a road surface.

Vehicle data may be stored in the vehicle data logger 260 after being generated by various sensors. The various sensors may be coupled to the vehicle data logger 260, and they may be positioned adjacent to one or more mechanical parts of the motor vehicle. In one embodiment, for example, an angular sensor 262 may be installed adjacent to a front axle 243 of the motor vehicle. The angular sensor 262 may be used for detecting a turning angle of the motor vehicle. In another embodiment, for example, a rotation speed sensor 264 may be installed adjacent to each wheel 245 of the motor vehicle. The rotation speed sensor 264 may be used for detecting the speed, acceleration, and/or deceleration of the motor vehicle. In yet another embodiment, an optical sensor 266 may be installed adjacent to one or more lighting device 247, such as a turn signal light, front light, brake light, rear light, backup light, and/or high beam light. The optical sensor 266 may be used for detecting the working condition of the lighting device 247.

After processing the vehicle data request signal, the interface processor 220 may retrieve vehicle data from the vehicle data logger 260. In one embodiment, the diagnosis processor 230 may be coupled to the vehicle data logger 260 for providing security access thereof. As such, the interface processor 220 may access the vehicle data logger 260 via the diagnosis processor 230. In an alternative embodiment, the interface processor 220 may be coupled to the vehicle data logger 260. As such, the interface processor 220 may retrieve vehicle data directly from the vehicle data logger 260.

The interface processor 220 may transmit the retrieved vehicle data to the VMA processor 272 such that the activated VMA may finish the initialization and/or calibration procedures. After the initialization process, the VMA processor 272 may generate a connection request signal to the interface processor 220. The interface processor 220 may establish a connection between the VMA processor 272 and the vehicle system 240 upon receiving the connection request.

In one embodiment, the vehicle system 240 may include a vehicle maneuver controller 241, various actuating devices that are controlled by the vehicle maneuver controller 241, various physical components that are manipulated by the various actuating devices, and a vehicle data logger 260.

The physical components may be responsible for performing the basic physical functions of the motor vehicle. For example, the physical components may include a front axle 243 for controlling the turn angle of the motor vehicle, four wheels 245 for controlling the speed of the motor vehicle, and/or lighting devices 247 (e.g., head lights, rear lights, turn signal lights, and/or backup lights) for performing various lighting functions. In another example, the physical components may include brake pads and/or transmission gears.

The actuating devices may be responsible for converting one or more control signals generated by the vehicle maneuver controller 241 to one or more mechanical forces electric forces, and/or electromechanical forces. For example, the actuating devices may include a steering device 242, a proportion device 244, and a body device 246. The steering device 242 may be used to manipulate the front axle 243. The proportion device 244 may control the acceleration, deceleration, and/or energy consumption of the motor vehicle. As such, the proportion device 244 may be used for manipulating the transmission gears, break pads, and/or engine of the motor vehicle. The body device 246 may be used for coordinating the operation of various lighting devices 247 with the movement of the motor vehicle.

The vehicle maneuver controller 241 may be coupled to various actuating devices. The vehicle maneuver controller 241 may be responsible for generating one or more control signals for controlling the operations of the various actuating devices. In generating the control signals, the vehicle maneuver controller 241 may be configured to compile, process, and/or execute the instructions received from the VMA processor 272.

Optionally, the vehicle maneuver controller 241 may be a master device of a servo system, which employs negative feedback to monitor and correct the performance of a close-loop system. For example, the vehicle maneuver controller 241 may be coupled to various sensors (e.g., the angular sensor 262, the rotation speed sensor 264, and/or the optical sensor 266), such that the vehicle maneuver controller 241 may be used for monitoring the operation and/or conditions of various physical components.

Alternatively, the vehicle maneuver controller 241 may be a slave device of a servo mechanism. The vehicle maneuver controller 241 may implement the instructions received from the VMA processor 272 without performing any monitoring or correcting function. Instead, the VMA processor 272 may be the master device, so that the VMA processor 272 may monitor and correct the tasks being implemented by the vehicle maneuver controller 241.

Depending on the types of VMA being executed, the connection between the VMA processor 272 and the vehicle system 240 may be bidirectional or unidirectional. In the event that the connection is bidirectional, the VMA processor 272 may send instructions to and receive feedback signals from the vehicle system 240. The feedback signals may be embedded with information that includes, but is not limited to, confirmation response from the vehicle maneuver controller 241, monitoring information from the vehicle maneuver controller 241, and vehicle data from the vehicle data logger 260. As such, the connection between the VMA processor 272 and the vehicle system 240 may include a control channel and an information channel. In the event that the connection is unidirectional, the VMA processor 272 may send instructions to the vehicle system 240, and the vehicle maneuver controller 241 may send handshake signals to the VMA processor 272 upon receiving a request from the VMA processor 272. As such, the connection between the VMA processor 272 and the vehicle system 240 may include merely a control channel.

Moreover, the VMA processor 272 may also receive operational input from the operator via the VMA sensor 274. The VMA sensor 274 is independent of the vehicle maneuver input sub-block 204 because it is dedicated for receiving operational input for the VMA device 270. The VMA sensor 274 may be used for sensing one or more motions of the operator. Moreover, the VMA sensor 274 may be used for sensing one or more external conditions that may affect the maneuverability of the motor vehicle. For example, the VMA sensor 274 may be used for detecting upcoming objects in an obstacle avoidance application. The VMA sensor 274 may include, but is not limited to, a control stick, a touched pad, a touch sensor, an optical sensor, a proximity sensor, an image sensor, a ranging sensor and/or a heat sensor.

According to various embodiments of the present invention, an activated VMA may be suspended, overridden, and/or terminated by one or more operator commands and/or one or more predefined events. An activated VMA may be suspended, overridden, and/or terminated when an operator controls one or more vehicle maneuver devices of the vehicle maneuver input sub-block 204, or when the VMA sensor 274 generates a sensing signal. Moreover, an activated VMA may be suspended, overridden, and/or terminated when an operator selects one or more options from a menu, which may be generated by the interface processor 220 and presented to the operator by the operator I/O sub-block 202.

Furthermore, an activated VMA may be suspended, overridden, and/or terminated when one of several predefined events is detected by the interface processor 220. The predefined events may include, but are not limited to, events that negatively impact the performance of the vehicle system 240. The interface processor 220 may detect the predetermined events via the diagnosis processor 230 or by monitoring the various sensors via the vehicle maneuver controller 241. For example, the interface processor 220 may detect a predefined event when one of the wheels 245 fails to brake. In another example, the interface processor 220 may detect a predefined event when the front axle 243 fails to turn. In another example, the interface processor 220 may detect a predefined event when the proportion device 244 does not respond to the control signal of the vehicle maneuver controller 241.

The operator I/O sub-block 202 and the vehicle maneuver input sub-block 204 may each generate an interrupt signal, which may be received and processed by the interface processor 220. Depending on the nature of the activated VMA, the interface processor 220 may suspend or override the VMA upon receiving and processing the interrupt signal.

The operator I/O sub-block 202, the vehicle maneuver input sub-block 204, and the diagnosis processor 230 may each generate a termination signal. The interface processor 220 may terminate or abort the activated VMA upon receiving and processing the termination signal.

When a VMA is suspended, the interface processor 220 may instruct the VMA processor 272 to stop executing the VMA. The interface memory 225 may temporarily store the parameters of the suspended VMA. The stored parameters may be retrieved when the VMA is resumed. Moreover, the interface processor 220 may temporarily disable the connection between the VMA processor 272 and the vehicle maneuver controller 241, such that the vehicle maneuver controller 241 may be controlled by the signals generated by the vehicle maneuver input sub-block 204. During the suspension of the VMA, the operator may gain control of the maneuverability of the motor vehicle. The suspended VMA may be resumed by an operator, who may select a resume option from a menu presented by the operator I/O sub-block 202. When the resume option is selected, the I/O sub-block 202 may generate a resume signal. Upon receiving and processing the resume signal, the interface processor 220 may re-establish the connection between the VMA processor 272 and the vehicle maneuver controller 241. Then, the interface processor 220 may instruct the VMA processor 272 to resume the execution of the suspended VMA.

When a VMA is overridden, the operator (e.g., a driver) and the VMA may jointly control the vehicle maneuver controller 241 but the operator generated command may override the instructions generated by the VMA processor 272. The interface processor 220 may allow the VMA processor 272 to continue the execution of the overridden VMA while momentarily disabling the connection between the VMA processor 272 and the vehicle maneuver controller 241. For example, the interface processor 220 may monitor the signals generated by the vehicle maneuver input sub-block 204 to ascertain whether the operator is trying to control the movement of the motor vehicle. Upon detecting an input signal from the vehicle maneuver sub-block 204, the interface processor 220 may disable the connection between the VMA processor 272 and the vehicle maneuver controller 241. Accordingly, the vehicle maneuver controller 241 may receive, and be controlled by, the input signal instead of the instructions generated by the VMA processor 272. When the input signal is not detected, the interface processor 220 may reengage the VMA processor 272 to the vehicle maneuver controller 241.

When a VMA is terminated, the interface processor 220 may instruct the VMA processor 272 to terminate the execution of the VMA. The interface memory 225 may store the instructions being executed before the VMA is terminated. The interface memory 225 may instruct the diagnosis processor 230 to analyze the executed instructions along with the vehicle data stored in the vehicle data logger 260. The diagnosis processor 230 may compare the executed instructions with the vehicle data to identify various issues, which may be related to the operation of the motor vehicle, the quality of the VMA, and/or the driving habits of the operator. For example, the diagnosis processor 230 may determine whether the actuating devices and physical components of the vehicle system 240 are functioning properly. In another example, the diagnosis processor 230 may determine whether the VMA contains any programming error. In another example, the diagnosis processor 230 may determine whether the operator respond well to the changing conditions of the road.

The diagnosis processor 230 may send the diagnostic results to the interface processor 220. In return, the interface processor 220 may generate an operator-friendly diagnostic summary, which may be presented to the operator via the operator I/O sub-block 202. Additionally, the interface processor 220 may generate one or more operator-friendly messages during the activation, suspension, overriding, and/or termination of one or more VMAs. Accordingly, the operator may be better equipped in learning and operating the VMAs.

The vehicle system 240 may also include an auxiliary controller 250 and an auxiliary device block 252 according to another embodiment of the present invention. The auxiliary controller 250 may be used for implementing the instructions received from the auxiliary application device 290. The auxiliary application device 290 may be similar to the VMA device 270. For example, the auxiliary application device 290 may include an auxiliary processor 292 and an auxiliary memory 296. The auxiliary memory 296 may be coupled to the auxiliary processor 292, and it may be used for storing one or more auxiliary applications. The auxiliary processor 292 may be coupled to the interface processor 220, and it may be used for executing one or more auxiliary applications. The auxiliary applications may be developed by a motor vehicle manufacturer and/or a third party developer. The auxiliary applications may include navigation application, interior climate control application, audio and video application, web-browsing application, and/or entertainment application.

In executing an auxiliary application, the auxiliary processor 292 may instruct the auxiliary controller 250 to generate one or more control signals for controlling one or more auxiliary devices of the auxiliary device block 252. The auxiliary devices may include an air conditioning device, a music player, a video player, a video game processor, and/or a global positioning system (GPS) device. In one embodiment, the interface processor 220 may provide a communication channel between the auxiliary processor 292 and the auxiliary controller 250. In another embodiment, the auxiliary processor 292 may be directly coupled to the auxiliary controller 250.

Although FIG. 2 shows that the interface processor 220, the diagnosis processor 230, the VMA processor 272, and the auxiliary processor 292 are separate processors, they can be combined to form a single processor according to an alternative embodiment of the present invention. The single processor may be part of the VMA interface 210, and it may be partition in several modules, each of which may be used for performing the functions of the interface processor 220, the diagnosis processor 230, the VMA processor 272, and the auxiliary processor 292.

Each of the interface processor 220, the diagnosis processor 230, the VMA processor 272, and the auxiliary processor 292 can be any computing device capable of receiving data, processing the received data, and outputting the processed data. Each of the interface processor 220, the diagnosis processor 230, the VMA processor 272, and the auxiliary processor 292 may be implemented using hardware, software, firmware, middleware, microcode, or any combinations thereof. The interface processor 220 may be an Advanced RISC Machine (ARM), a computer, a controller, a digital signal processor (DSP), a microprocessor, circuitry, a processor chip, or any other device capable of processing data, and combinations thereof.

Although FIG. 2 shows that the interface memory 225, the vehicle data logger 260, the VMA memory 276, and the auxiliary memory 296 are separately implemented, they can be implemented in a single memory device according to an alternative embodiment of the present invention. The single memory device may be partitioned into several regions, each of which may be used for storing data to be processed by the interface processor 220, the diagnosis processor 230, the VMA processor 272, and the auxiliary processor 292.

Each of the interface memory 225, the vehicle data logger 260, the VMA memory 276, and the auxiliary memory 296 may include or store various routines and data. The term "memory" includes, but is not limited to, random access memory (RAM), flash memory, read-only memory (ROM), EPROM, EEPROM, registers, hard disk, removable disk, CD-ROM, DVD, Blu-ray disk, and various other media capable of storing, containing or carrying instruction(s) and/or data.

The discussion now turns to one or more algorithms of interface software, which may be executed by a processor for use in a motor vehicle. Generally, the interface software, upon being executed by the processor, may cause the processor to provide an interface for installing, updating, uninstalling, activating, and/or monitoring one or more vehicle maneuver applications (VMA). Accordingly, the interface software may invoke one or more functions of the interface processor 220 as discussed in FIG. 2.

Figure 3:
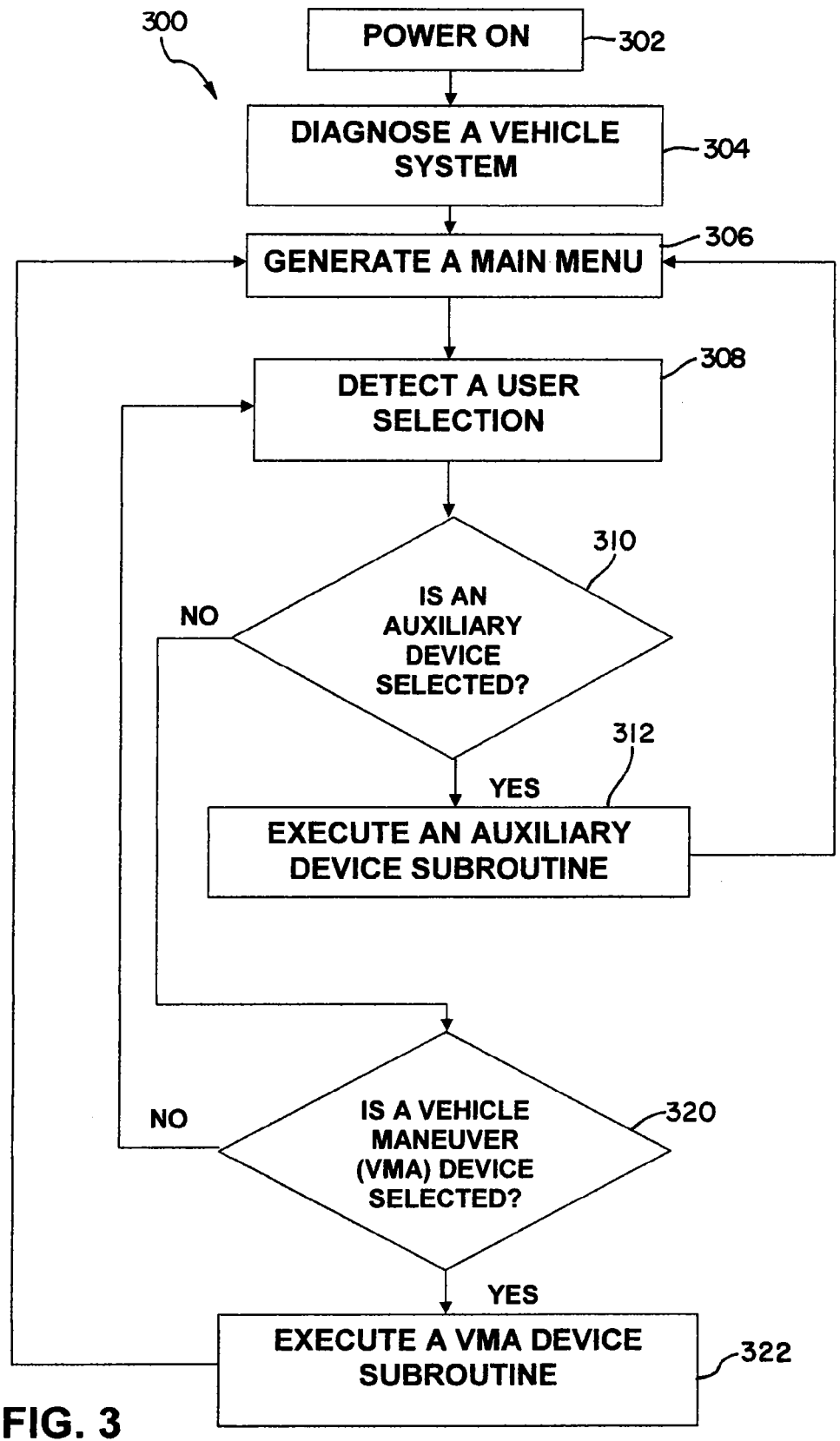
FIG. 3 shows a flowchart of an algorithm of an interface system software according to an embodiment of the present invention.

FIG. 3 shows a flowchart of an algorithm of interface system software 300 according to an embodiment of the present invention. When executed by a processor, the interface system software 300 may cause the processor to perform the following method steps.

In step 302, the processor may power on the interface system. In response to an operator request, the processor may pre-load, preset, or reset one or more already installed VMAs. In step 304, the processor may diagnose a vehicle system, such as the vehicle system 240 as discussed in FIG. 2. The processor may retrieve vehicle data from the vehicle data logger 260 and determine whether the physical components and the actuating devices of the vehicle system are functioning properly. After performing the diagnosis, the processor may display the diagnostic results to the operator. Moreover, the processor may save the diagnostic result in a memory, such as the interface memory 225, and/or transmit the diagnostic result to a remote network via a network device, such as the wireless network device 280.

In step 306, the processor may generate a main menu, which may be presented to an operator via an output device, such as the operator I/O sub-block 202 as discussed in FIG. 2. The main menu may allow the operator to operate an auxiliary device, such as the auxiliary application device 290 as discussed in FIG. 2. Moreover, the main menu may allow the operator to operate a VMA device, such as the VMA device 270 as discussed in FIG. 2.

Figure 9:
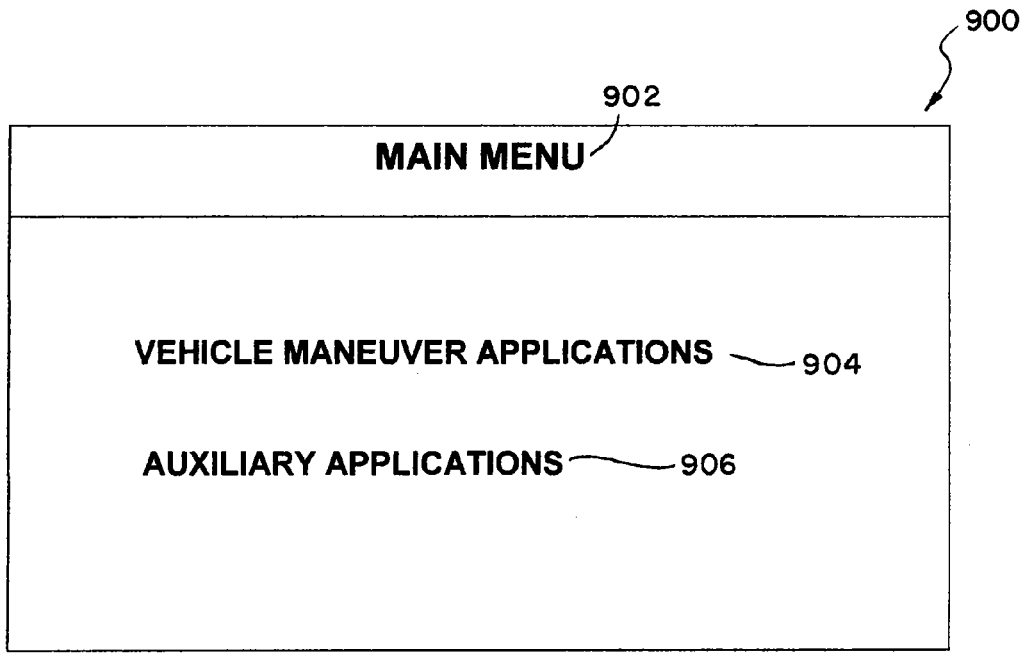
FIG. 9 shows a screen display of a main menu according to an embodiment of the present invention.

As exemplified in FIG. 9, the main menu may be presented in a main menu screen display 900. The main menu screen display 900 may include a title message 902, a vehicle maneuver applications (VMA) interactive option 904, and an auxiliary applications interactive option 906. An operator may select the VMA interactive option 904 or the auxiliary applications interactive option 906 by touching the main menu screen display 900.

In step 308, the processor may detect an operator selection. In step 310, the processor may determine whether an auxiliary device is selected. For example, if the operator selects the auxiliary applications interactive option 906, an auxiliary-selection signal may be generated. Upon detecting the auxiliary-selection signal, the processor may determine that the auxiliary device is selected, and it may perform step 312. In step 312, the processor may execute an auxiliary device subroutine. After the auxiliary device subroutine is completed, the processor may return to step 306.

If the auxiliary-selection signal is not detected, the processor may determine that the auxiliary device is not selected, and it may perform step 320. In step 320, the processor may determine whether a VMA device is selected. For example, if the operator selects the VMA interactive option 904, a VMA-device-selection signal may be generated. Upon detecting the VMA-device-selection signal, the processor may determine that the VMA device is selected, and it may perform step 322. In step 322, the processor may execute a VMA device subroutine, which will be discussed in detail in FIG. 4. After the VMA device subroutine is completed, the processor may return to step 306.

Although FIG. 3 shows that the determination step 310 is performed before the determination step 320, the determination step 320 may be performed before, or in parallel with, the determination step 310 according to various alternative embodiments of the present invention.

Figure 4:
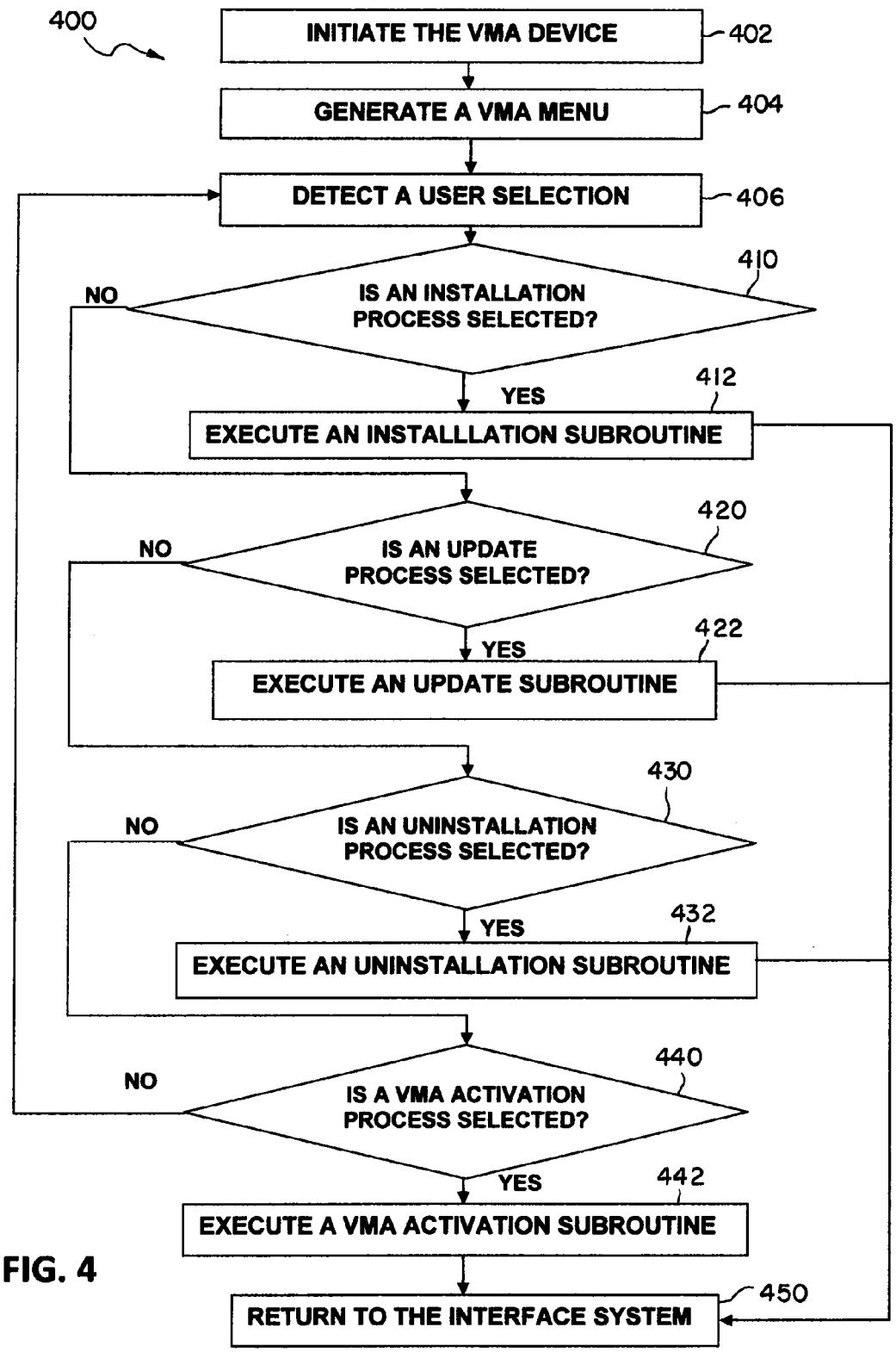
FIG. 4 shows a flowchart of an algorithm of a VMA device subroutine according to an embodiment of the present invention.

FIG. 4 shows a flowchart of an algorithm of a VMA device subroutine 400 according to an embodiment of the present invention. When executed by a processor, the VMA device subroutine 400 may cause the processor to perform the following method steps.

In step 402, the processor may initiate the VMA device. For example, the processor may load the parameters from the interface memory 225 to the VMA processor 272 as discussed in FIG. 2. In step 404, the processor may generate a VMA menu. Generally, the VMA menu may allow an operator to install, update, uninstall, and/or activate one or more VMAs.

Figure 10:
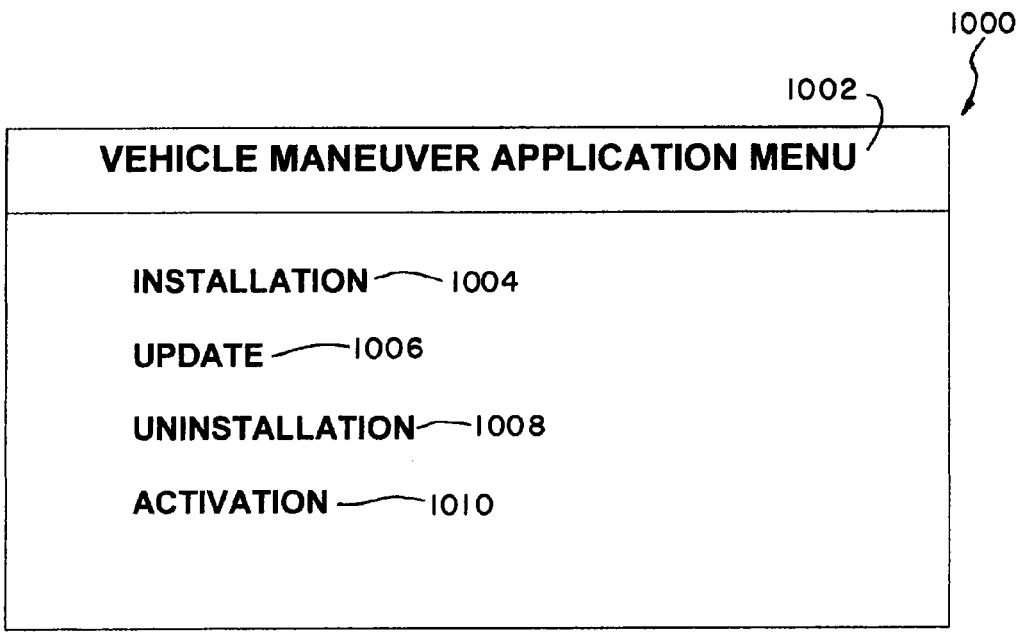
FIG. 10 shows a screen display of a VMA menu according to an embodiment of the present invention.

As exemplified in FIG. 10, the VMA menu may be presented in a VMA menu screen display 1000. The VMA menu screen display 1000 may include a title message 1002, an installation interactive option 1004, an update interaction option 1006, an uninstallation interactive option 1008, and an activation interactive option 1010. By touching the VMA menu screen display 1000, an operator may select one of the installation interactive option 1004, the update interaction option 1006, the uninstallation interactive option 1008, and the activation interactive option 1010.

Figure 11:
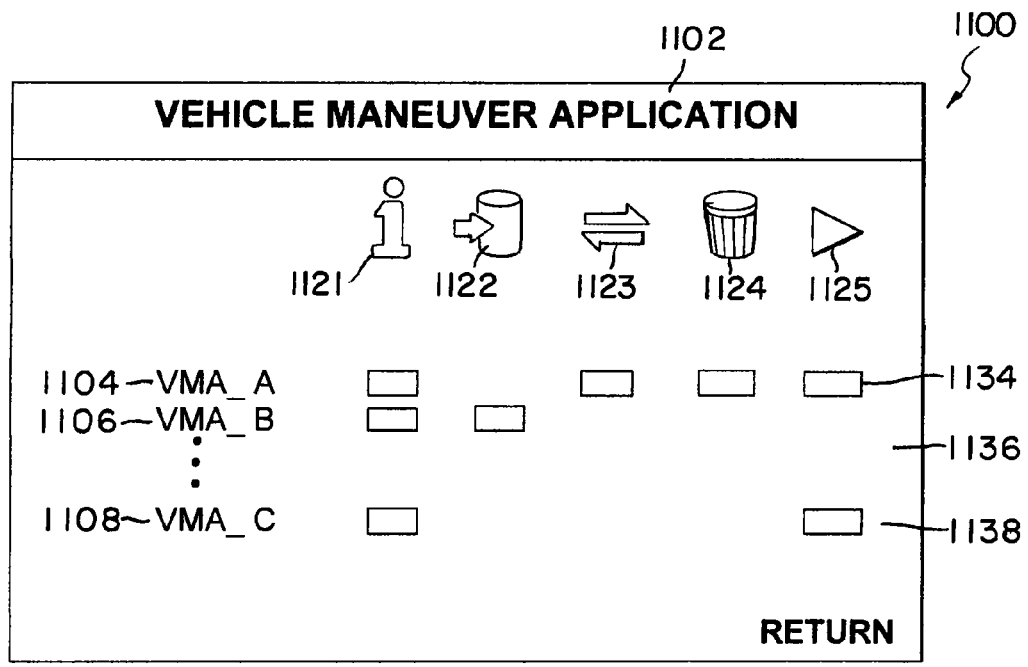
FIG. 11 shows a screen display of an alternative VMA menu according to an embodiment of the present invention.

Alternatively, as exemplified in FIG. 11, the VMA menu may be presented in an alternative VMA menu screen display 1100. The alternative VMA menu screen display 1100 may include a title message 1102, a list of VMAs, several action icons, several interactive option columns, and a return interactive option 1110. The list of VMAs may include already-installed VMAs, such as the VMA_A 1104. The list of VMAs may also include detected, but not-yet-installed, VMAs, such as VMA_B 1106. Once enter step 404, the processor may automatically detect the not-yet-installed VMAs via the VMA input sub-block 206 or the wireless network device 280 as shown in FIG. 2.

The several action icons may include an information icon 1121, an installation icon 1122, an update icon 1123, an uninstallation icon 1124, and/or an activation (execution) icon 1125. The several interactive option columns may be positioned below the several action icons. Each interactive option column may be associated with a listed VMA, and it may allow the operator to select various actions that are available to the associated VMA.

For example, a first interactive option column 1134 may be associated with the VMA_A 1104. Because the VMA_A 1104 is already installed, the first interactive option column 1134 may allow the operator to select the information icon 1121, the update icon 1123, the uninstallation icon 1124, and/or the activation icon 1125. In another example, a second interactive option column 1136 may be associated with the VMA_B 1106. Because the VMA_B 1106 is not yet installed, the second interactive option column 1136 may only allow the operator to select the information icon 1121 and/or the installation icon 1122. For yet another example, a third interactive option column 1136 may be associated with the VMA_C 1106. Because the VMA_A 1104 is only accessible via a remote server, the third interactive option column 1136 may only allow the operator to select the information icon 1121 and/or the activation icon 1125.

If an operator selects any of the interactive options, the processor may perform a function associated with the selected option. If the operator selects the return option, the processor may return to the previous main menu screen display 900.

In step 406, the processor may detect an operator selection. In step 410, the processor may determine whether an installation process is selected. For example, if the operator selects the installation icon 1122, an installation signal (command) may be generated. Upon detecting the installation signal (command), the processor may determine that the installation process is selected, and it may perform step 412. In step 412, the processor may execute an installation subroutine, which will be discussed in detail in FIG. 5. After the installation subroutine is completed, the processor may perform step 450, in which the processor may return to the interface system.

If the installation signal (command) is not detected, the processor may determine that the installation process is not selected, and it may perform step 420. In step 420, the processor may determine whether an update process is selected. For example, if the operator selects the update icon 1123, an update signal (command) may be generated. Upon detecting the update signal (command), the processor may determine that the update process is selected, and it may perform step 422. In step 422, the processor may execute an update subroutine, which will be discussed in detail in FIG. 6. After the update subroutine is completed, the processor may perform step 450, in which the processor may return to the interface system.

If the update signal (command) is not detected, the processor may determine that the update process is not selected, and it may perform step 430. In step 430, the processor may determine whether an uninstallation process is selected. For example, if the operator selects the uninstallation icon 1124, an uninstallation signal (command) may be generated. Upon detecting the uninstallation signal (command), the processor may determine that the uninstallation process is selected, and it may perform step 432. In step 432, the processor may execute an uninstallation subroutine, which will be discussed in detail in FIG. 7. After the uninstallation subroutine is completed, the processor may perform step 450, in which the processor may return to the interface system.

If the uninstallation signal (command) is not detected, the processor may determine that the uninstallation process is not selected, and it may perform step 440. In step 440, the processor may determine whether an activation (execution) process is selected. For example, if the operator selects the activation icon 1125, an activation signal (command) may be generated. Upon detecting the activation signal (command), the processor may determine that the activation process is selected, and it may perform step 442. In step 442, the processor may execute an activation subroutine, which will be discussed in detail in FIG. 8. After the activation subroutine is completed, the processor may perform step 450, in which the processor may return to the interface system.

Although FIG. 4 shows that the determination steps 410, 420, 430, and 440 is performed in a particular sequence, the determination steps 410, 420, 430, and 440 may be performed in parallel or in other sequences in various alternative embodiments.

Figure 5:
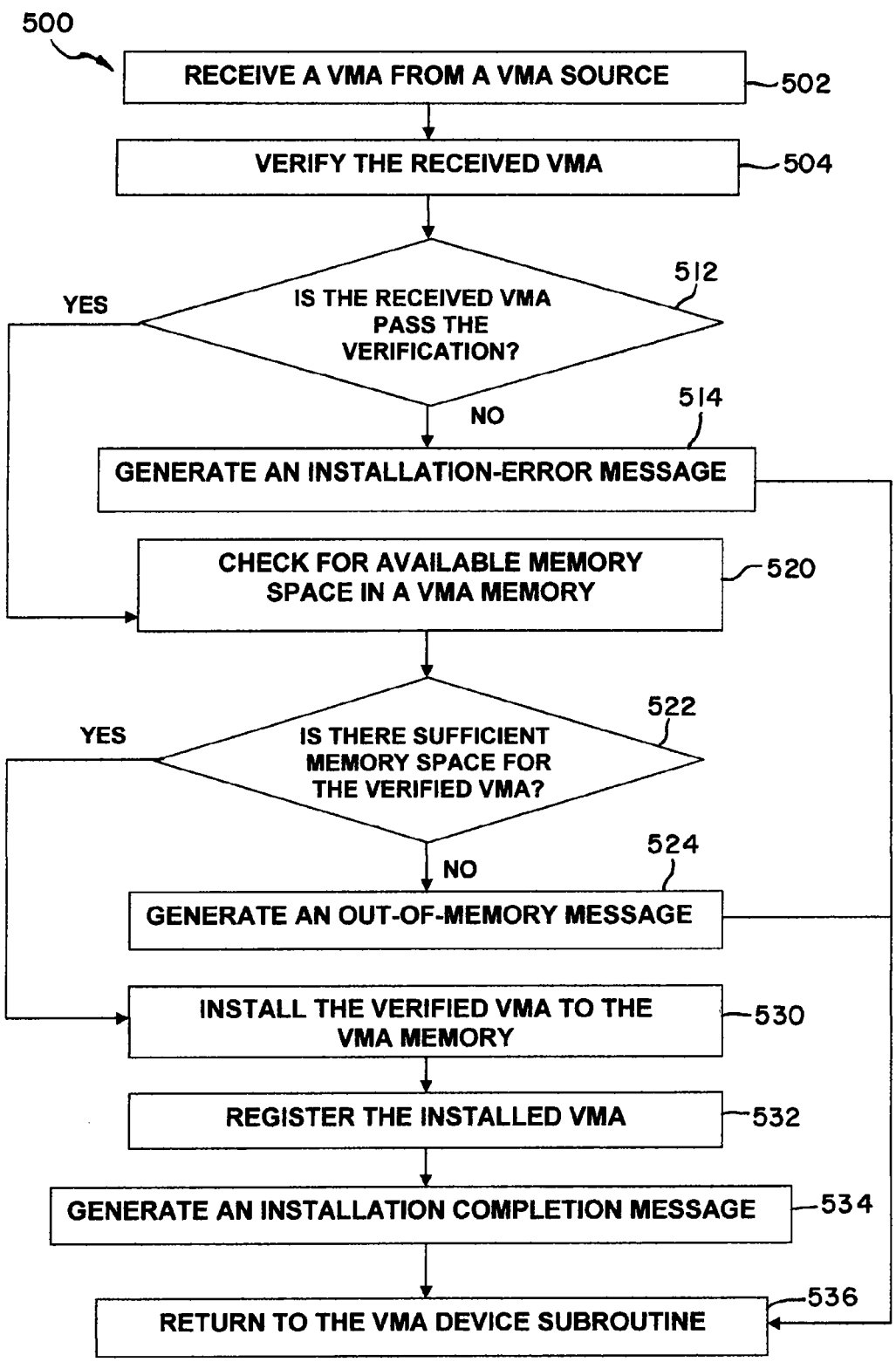
FIG. 5 shows a flowchart of an algorithm of an installation subroutine according to an embodiment of the present invention.

FIG. 5 shows a flowchart of an algorithm of an installation subroutine 500 according to an embodiment of the present invention. When executed by a processor, the installation subroutine 500 may cause the processor to perform the following method steps.

In step 502, the processor may receive a VMA from a VMA source. The VMA source may include the VMA input sub-block 206 and/or a wireless network, which may be accessible via the wireless network device 280 as shown in FIG. 2. In step 504, the processor may verify the received VMA. For example, the processor may ascertain whether the received VMA is certified and/or tested. In another example, the processor may perform a compatibility test to ensure that the received VMA is compatible with the vehicle maneuver controller of the vehicle system.

In step 512, the processor may determine whether the received VMA passes the verification. If the received VMA fails the verification, the installation process may be terminated. As such, in step 514, the processor may generate an installation-error message, which may be presented to the operator via the operator I/O sub-block 202 as shown in FIG. 2. In step 536, the processor may exit the installation subroutine and return to the VMA Device subroutine 400. On the other hand, if the received VMA passes the verification, the installation process may proceed to step 520.

In step 520, the processor may check for available memory space in a VMA memory, such as the VMA memory 276 as shown in FIG. 2. In step 522, the processor may determine whether the VMA memory may have sufficient memory space for storing the verified VMA. If the VMA memory does not have sufficient memory space, the installation process may be terminated. As such, in step 524, the processor may generate an out-of-memory message, which may be presented to the operator via the operator I/O sub-block 202 as shown in FIG. 2. In step 536, the processor may exit the installation subroutine and return to the VMA Device subroutine 400. On the other hand, if the VMA memory has sufficient memory space, the installation process may proceed to step 530.

In step 530, the processor may install the verified VMA to the VMA memory. In step 532, the processor may register the installed VMA, such that the installed VMA may be identified, located, and retrieved in the future. In step 534, the processor may generate an installation completion message, which may be presented to the operator via the operator I/O sub-block 202 as shown in FIG. 2. In step 536, the processor may exit the installation subroutine and return to the VMA device subroutine 400.

In one embodiment, the processor may perform the installation step and the registration step. In an alternative embodiment, the processor may instruct a secondary processor, such as the VMA processor 272, to perform the installation step and the registration step. Accordingly, the processor may receive an installation confirmation signal from the secondary processor when the installation and registration steps are completed.

Figure 6:
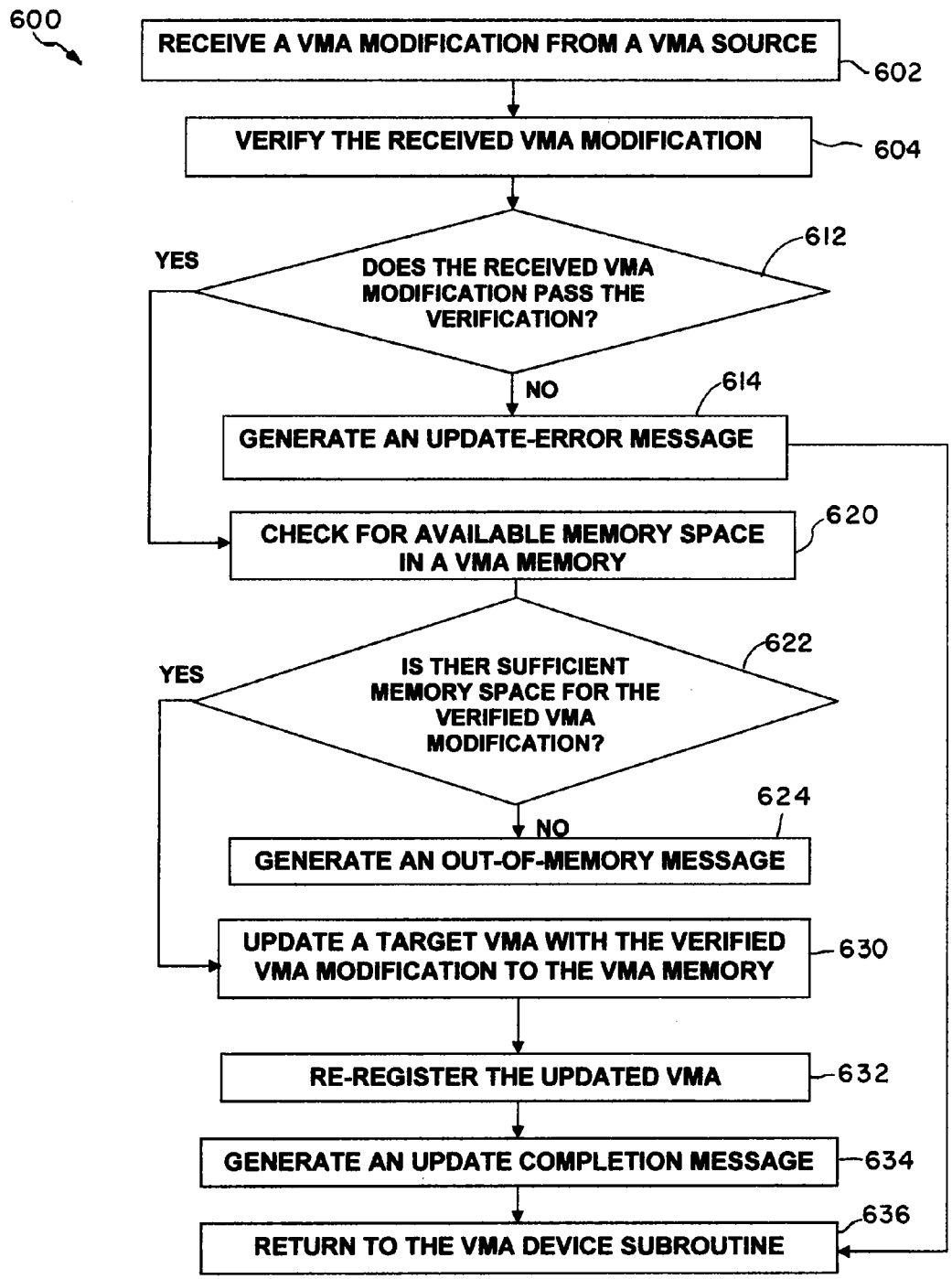
FIG. 6 shows a flowchart of an algorithm of an update subroutine according to an embodiment of the present invention.

FIG. 6 shows a flowchart of an algorithm of an update subroutine 600 according to an embodiment of the present invention. When executed by a processor, the update subroutine 600 may cause the processor to perform the following method steps.

In step 602, the processor may receive a VMA modification from a VMA source. The VMA source may include the VMA input sub-block 206 and/or a wireless network, which may be accessible via the wireless network device 280 as shown in FIG. 2. The VMA modification may be a data patch that can be used for updating or upgrading the currently installed VMA. Alternatively, the VMA modification may be a later version of the currently installed VMA.

In step 604, the processor may verify the received VMA modification. For example, the processor may ascertain whether the received VMA modification is certified and/or tested. In another example, the processor may perform a compatibility test to ensure that the received VMA modification is compatible with the vehicle maneuver controller of the vehicle system. In yet another example, the processor may perform a system stability test to assess the impact of modifying the VMA on the overall stability of the vehicle system.

In step 612, the processor may determine whether the received VMA modification passes the verification. If the received VMA fails the verification, the update process may be terminated. As such, in step 614, the processor may generate an update-error message, which may be presented to the operator via the operator I/O sub-block 202 as shown in FIG. 2. In step 636, the processor may exit the update subroutine and return to the VMA Device subroutine 400. On the other hand, if the received VMA modification passes the verification, the update process may proceed to step 620.

In step 620, the processor may check for available memory space in a VMA memory, such as the VMA memory 276 as shown in FIG. 2. In step 622, the processor may determine whether the VMA memory may have sufficient memory space for storing the verified VMA modification. If the VMA memory does not have sufficient memory space, the update process may be terminated. As such, in step 624, the processor may generate an out-of-memory message, which may be presented to the operator via the operator I/O sub-block 202 as shown in FIG. 2. In step 636, the processor may exit the update subroutine and return to the VMA Device subroutine 400. On the other hand, if the VMA memory has sufficient memory space, the update process may proceed to step 630.

In step 630, the processor may update the target VMA with the verified VMA modification. In step 632, the processor may re-register the updated VMA, such that the updated VMA may be identified, located, and retrieved in the future. In step 634, the processor may generate an update completion message, which may be presented to the operator via the operator I/O sub-block 202 as shown in FIG. 2. In step 636, the processor may exit the update subroutine and return to the VMA device subroutine 400.

In one embodiment, the processor may perform the updating step and the re-registration step. In an alternative embodiment, the processor may instruct a secondary processor, such as the VMA processor 272, to perform the updating step and the re-registration step. Accordingly, the processor may receive an update confirmation signal from the secondary processor when the updating and re-registration steps are completed.

Figure 7:
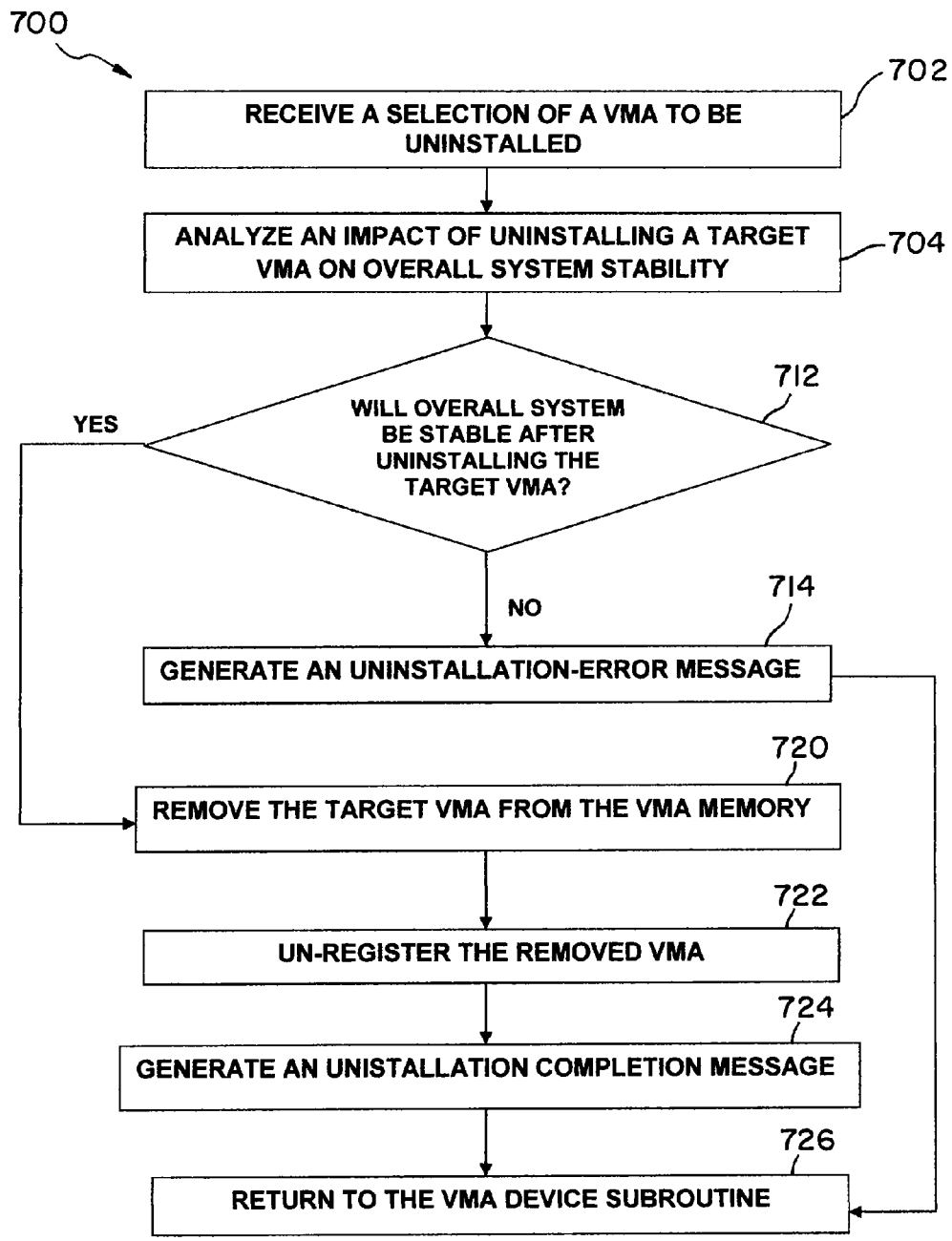
FIG. 7 shows a flowchart of an algorithm of an uninstallation subroutine according to an embodiment of the present invention.

FIG. 7 shows a flowchart of an algorithm of an uninstallation subroutine 700 according to an embodiment of the present invention. When executed by a processor, the uninstallation subroutine 700 may cause the processor to perform the following method steps.

In step 702, the processor may receive a selection for a VMA to be uninstalled. The selection may be received via the operator I/O sub-block 202, which may present an uninstallation interactive option as shown in FIGS. 10 and 11.

In step 704, the processor may analyze an impact of uninstalling the selected VMA on the stability of the overall system. For example, the processor may assess whether the uninstallation may corrupt one or more unselected VMAs. In another example, the processor may assess whether the uninstallation may disrupt the operation of one or more existing VMAs. In yet another example, the processor may assess whether the uninstallation may obstruct, disable, or retard one or more functionalities of the vehicle system.

In step 712, the processor may determine whether the overall system will be stable after uninstalling the target VMA. If the processor determines that the uninstallation may cause significant instability to the overall system, the processor may terminate the uninstallation process. As such, in step 714, the processor may generate an uninstallation-error message, which may be presented to the operator via the operator I/O sub-block 202 as shown in FIG. 2. In step 726, the processor may exit the uninstallation subroutine and return to the VMA Device subroutine 400. On the other hand, if the processor determines that the uninstallation does not cause significant instability to the overall system, the uninstallation process may proceed to step 720.

In step 720, the processor may remove the target VMA from the VMA memory, such as the VMA memory 276 as shown in FIG. 2. In step 722, the processor may unregister the removed VMA. As such, the process may reuse or recycle the memory space that is previously taken up by the uninstalled VMA. In step 724, the processor may generate an uninstallation completion message, which may be presented to the operator via the operator I/O sub-block 202 as shown in FIG. 2. In step 726, the processor may exit the update subroutine and return to the VMA device subroutine 400.

In one embodiment the processor may perform the removing step and the un-registration step. In an alternative embodiment, the processor may instruct a secondary processor, such as the VMA processor 272, to perform the removing step and the un-registration step. Accordingly, the processor may receive an uninstallation confirmation signal from the secondary processor when the removing and un-registration steps are completed.

Figure 8:
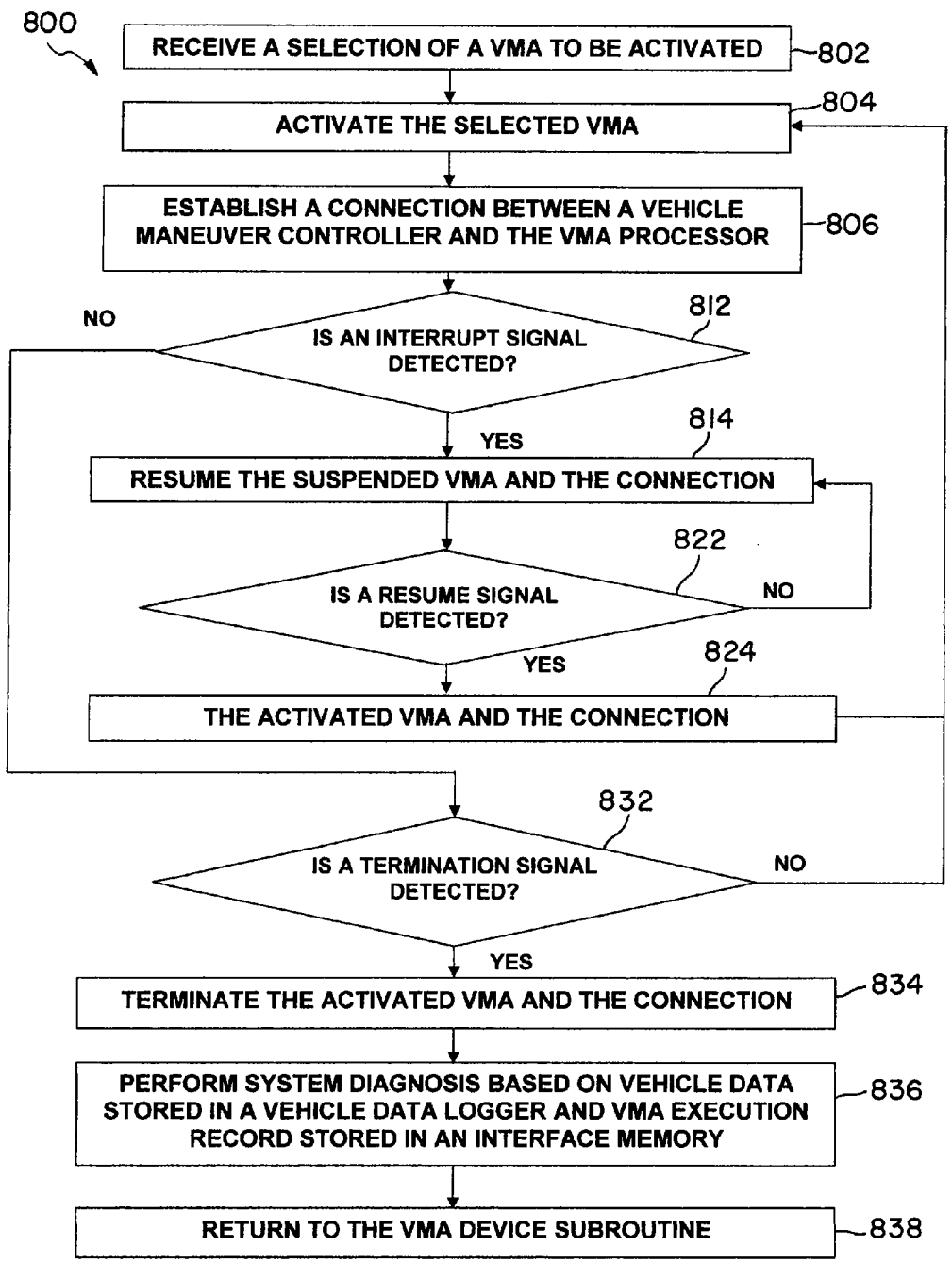
FIG. 8 shows a flowchart of an algorithm of a VMA activation subroutine according to an embodiment of the present invention.

FIG. 8 shows a flowchart of an algorithm of a VMA activation subroutine 800 according to an embodiment of the present invention. When executed by a processor, the VMA activation subroutine 800 may cause the processor to perform the following method steps.

In step 802, the processor may receive a selection for a VMA to be activated. The selection may be received via the operator I/O sub-block 202, which may present an activation interactive option as shown in FIGS. 10 and 11. In step 804, the processor may activate the selected VMA. The processor may load the selected VMA from the VMA memory to a VMA processor, such as the VMA processor 272. The VMA processor may be used for executing the instruction codes of the selected VMA. The processor may then retrieve vehicle data from the vehicle data logger 260 for initializing the selected VMA. Moreover, if necessary, the processor may retrieve preset or preload parameters from the interface memory 225 for initializing the selected VMA.

In step 806, the processor may establish a connection between a vehicle maneuver controller, such as the vehicle maneuver controller 241, and the VMA processor. Depending on the requirements of the activated VMA, the connection may be unidirectional and/or bidirectional. Once the connection is established, the VMA processor, and the activated VMA being executed thereon, may have access and control over the vehicle maneuver controller. As such, the activated VMA may control the movement of the vehicle with little human intervention. The processor may periodically, responsibly, and/or iteratively retrieve vehicle data from the vehicle data logger, which may contain updated information regarding the condition, operation, performance, and/or relative position of the motor vehicle. The processor may transmit the retrieved vehicle data to the VMA processor, such that the activated VMA may use the vehicle data as feedback information in controlling and/or communicating with the vehicle maneuver controller.

An operator may suspend, override, or terminate the activated VMA at any point. The VMA activation subroutine 800 may cause the processor to constantly, periodically, or iteratively detect operator input during the execution of the activated VMA. For example, in step 812, the processor may determine whether an interrupt signal is detected. Generally, an interrupt signal may be an operator generated command, which may request the activated VMA to be fully suspended (e.g., suspended) or partly suspended (e.g., overridden). The interrupt signal may be received by the operator I/O sub-block 202 while the operator I/O sub-block 202 is delivering an output from an auxiliary application, such as a navigation application.

Figure 12:
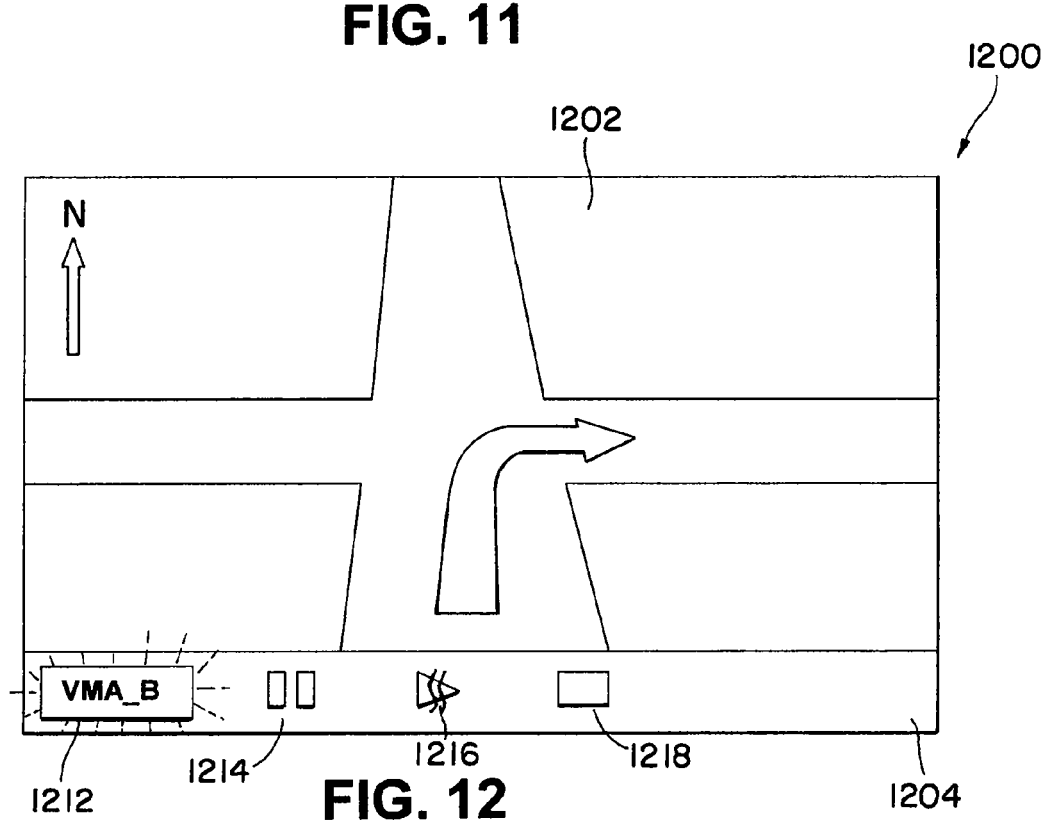
FIG. 12 shows a screen display of an activated VMA according to an embodiment of the present invention.

As exemplified in FIG. 12, a VMA bar 1204 may be displayed along with a navigation output 1202 in an activated VMA screen display 1200. When the VMA is fully activated, the VMA bar 1204 may display an active status icon 1212, a full suspension icon 1214, a partial suspension icon 1216, and/or a termination icon 1218. The active status icon 1212 may indicate that the VMA_B is activated and it is currently running at the background. An operator may select the full suspension icon 1214 to fully suspend the activated VMA or the partial suspension icon 1216 to partly suspend the activated VMA. Moreover, the operator may select the termination icon 1218 to terminate the activated VMA.

An interrupt signal may be generated by the operator I/O sub-block 202 when either the full suspension icon 1214 or the partial suspension icon 1216 is selected. The interrupt signal may be embedded with information that is related to the type of suspension the operator selected. Alternatively, the interrupt signal may be generated when the operator begins manipulating the vehicle maneuver input devices, such as the steering wheel 102, the gas pedal 104, the brake pedal 106, and/or the gear shifting device 108 as shown in FIG. 1. Depending on the duration and frequency of the manipulation, the interrupt signal may indicate that the operator selects a full suspension or a partial suspension.

If the interrupt signal is detected, the VMA activation subroutine 800 may proceed to step 814. In step 814, the processor may suspend the activated VMA and the connection between the VMA processor and the vehicle maneuver controller. The processor may further process the interrupt signal to determine whether the operator selected a full suspension or a partial suspension.

If a full suspension is selected, the processor may stop processing the instructions of the VMA and disable the connection between the VMA processor and the vehicle maneuver controller. When the VMA is fully suspended, the operator may control the movement of the motor vehicle. The vehicle data logger may continue recording vehicle data related to the operation of the physical components and the actuating devices.

In one embodiment, the processor may notify the operator that the VMA has transitioned or moved from an activation mode to a full suspension mode.

Figure 13:
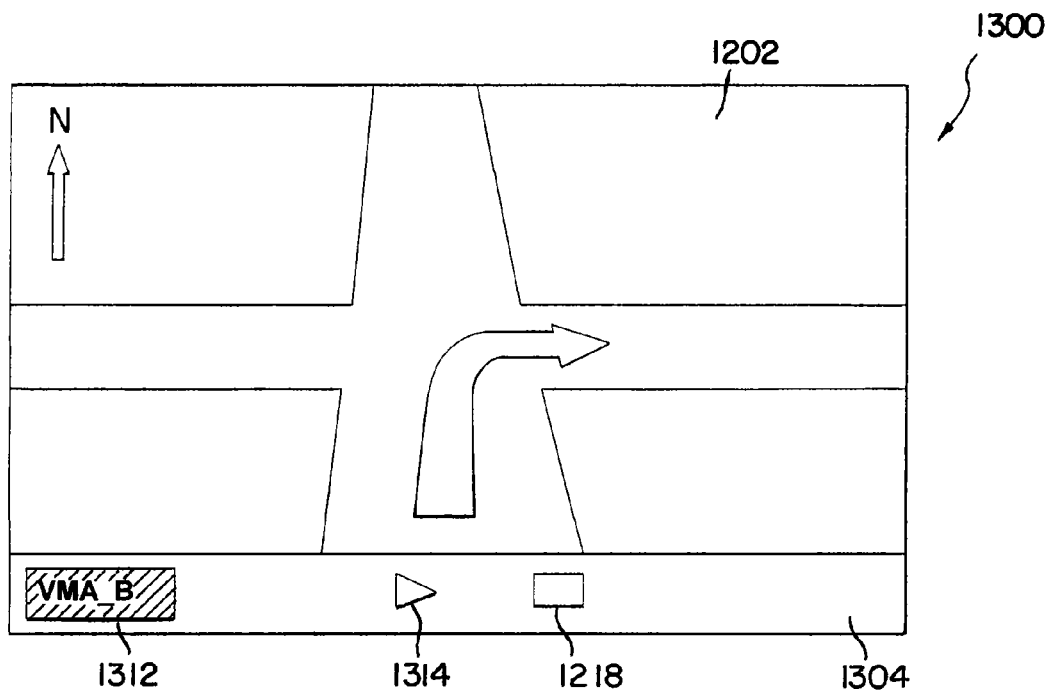
FIG. 13 shows a screen display of a suspended VMA according to an embodiment of the present invention.

As exemplified in FIG. 13, a VMA bar 1304 may be displayed along with a navigation output 1202 in a full suspension screen display 1300. When the VMA is fully suspended, the VMA bar 1304 may display a full suspension status icon 1312, a resume icon 1314, and the termination icon 1218. The full suspension status icon 1312 may indicate that the VMA_B is fully suspended, such that an operator may directly control movement of the motor vehicle. The operator may select the resume icon 1314 to resume the suspended VMA or the termination icon 1218 to terminate the suspended VMA.

On the other hand, if a partial suspension is selected, the processor may allow the operator input to override the instructions of the VMA. When the operator is manipulating one or more vehicle maneuver input devices, the processor may disable the connection between the VMA processor and the vehicle maneuver controller. As such, the vehicle maneuver controller may respond to the operator input instead of the instructions of the VMA. The vehicle data logger may continue recording vehicle data related to the operation of the physical components and the actuating devices. In return, the processor may continue transmitting the vehicle data from the vehicle data logger to the VMA processor. As such, the VMA processor may continue to process the instructions of the partly suspended VMA.

As soon as the operator is done manipulating the vehicle maneuver input device, the processor may allow the VMA processor to regain control on the vehicle maneuver controller. The vehicle maneuver controller may respond to the instructions of the partly suspended VMA until the operator begins manipulate one or more vehicle maneuver input devices again.

In one embodiment, the processor may notify the operator that the VMA has transitioned or moved from an activation mode to a partial suspension mode. As exemplified in FIG. 14, a VMA bar 1404 may be displayed along with a navigation output 1202 in a partial suspension screen display 1400. When the VMA is partly suspended, the VMA bar 1404 may display a partial suspension status icon 1412, the full suspension icon 1214, the resume icon 1314, and the termination icon 1218. The partial suspension status icon 1412 may indicate that the VMA_B is partly suspended, such that an operator may interact with the partly suspended VMA in controlling movement of the motor vehicle. The operator may select the resume icon 1314 to resume the suspended VMA or the termination icon 1218 to terminate the suspended VMA.

After the suspending step is performed, the processor may perform step 822, in which the processor may determine whether a resume signal is detected. A resume signal may be generated when the operator select the resume icon 1314. If the resume signal is not detected, the VMA activation subroutine 800 may return to step 814, in which the processor may continue to suspend the VMA. On the other hand, if the resume signal is detected, the VMA activation subroutine 800 may proceed to step 824. In step 824, the processor may resume the suspended VMA and the connection between the VMA processor and the vehicle maneuver controller. After that, the VMA activation subroutine 800 may return to step 804.

Figure 14:
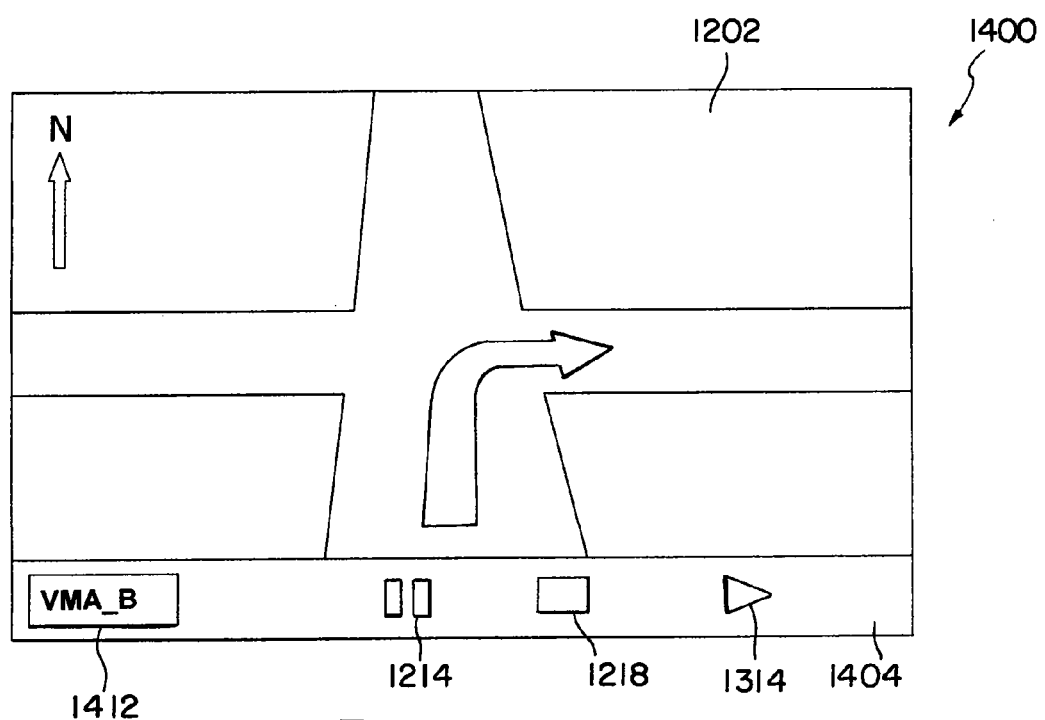
FIG. 14 shows a screen display of an overridden VMA according to an embodiment of the present invention.

Referring again to step 812, if the interrupt signal is not detected, the VMA activation subroutine 800 may proceed to step 832. In step 832, the processor may determine whether a termination signal is detected. Generally, a termination signal may be generated when an operator selects the termination icon 1218 as shown in FIGS. 12-14. Moreover, a termination signal may be generated when the sensors detect one or more exigent events. The exigent events may include, but are not limited to, physical component failure, actuating device failure, and/or vehicle maneuver controller failure. Moreover, the exigent events may include changes in external conditions, such as extreme snowing condition, heavy raining condition, and/or low visibility condition. In one embodiment, the exigent events may be predefined by the activated VMA. In another embodiment, the exigent events may be predefined by the interface system software 300. In yet another embodiment, the exigent events may be predefined by an operator.

If a termination signal is not detected, the VMA activation subroutine 800 may return to step 804, in which the processor may continue to execute the selected VMA. However, if a termination signal is detected, the VMA activation subroutine 800 may proceed to step 834.

In step 834, the processor may terminate the activated VMA and the connection between the VMA processor and the vehicle maneuver controller. The processor may create a VMA execution record for storing the already-executed instructions of the terminated VMA. The VMA execution record may be stored in the interface memory, and it may be retrieved for analysis of the performance of the VMA and/or one or more causes of driving incidents. The one or more driving incidents may include, but are not limited to, out-of-lane incident, speeding incident, front collision incident, rear-ended incident, lost-of-traction incident, physical components malfunction, actuating device malfunction, and/or vehicle maneuver controller malfunction.

In step 836, the processor may perform a system diagnosis based on the vehicle data and the VMA execution record. The processor may match and/or synchronize the vehicle data with the already-executed instructions of the VMA execution record. Accordingly, the processor may identify one or more driving incidents. The processor may further determine one or more causes of the identified driving incidents by analyzing the vehicle data in isolation, and/or in combination with, the VMA execution record. Additionally, the processor may submit the analyzed results to various agencies via one or more remote networks. In return, the agencies may use the analyzed results to improve the quality of the VMA.

According to an alternative embodiment of the present invention, the processor may perform the diagnosing step contemporaneously as the VMA is being executed. The processor may analyze the real time conditions of the physical components and the actuating devices along with the real time performance of the activated VMA. The processor may submit the real time analysis to an agent via a remote network. Based on the real time analysis, the agent may anticipate any soon-to-occur driving incident. As such, the agent may help avoid the soon-to-occur driving incident by sending warning messages to the operator and/or overriding the activated VMA.

After step 836, the VMA activation subroutine 800 may be completed. In step 838, the processor may exit the VMA activation subroutine 800 and return to the VMA device subroutine 400.

In one embodiment, the processor may perform the activating step, the suspending step, the resuming step, the terminating step, and the diagnosing step. In an alternative embodiment, the processor may instruct a secondary processor, such as the VMA processor 272, to perform the activating, suspended, resuming, and terminating steps, and it may instruct a tertiary processor, such as the diagnosis processor 230, to perform the diagnosing step. Accordingly, the processor may receive various confirmation signals from the secondary and tertiary processor upon the activating step, suspending step, resuming step, terminating step, and/or diagnostic step are completed.

Referring again to FIG. 2, the VMA interface 210 may include one or more lock modes to limit and/or control access to the VMA device 270 according to various embodiments of the present invention. During the execution of a lock mode, the VMA interface 210 may prevent unauthorized operators from installing, modifying, and/or uninstalling any VMA. Additionally, the VMA interface 210 may limit the amount or types of VMAs which an authorized operator may enable, disable, activate, override, and/or terminate.

For example, the VMA interface 210 may only allow operator A to install new VMA without permitting operator A to update or uninstall any of the installed VMAs. For another example, the VMA interface 210 may allow operator B to fully access a first VMA (e.g., the lane change assistance application) while denying operator B the ability to terminate a second VMA (e.g., the collision avoidance application). For yet another example, the VMA interface 210 may allow operator C to activate and/or terminate only a first group of VMAs (e.g., assistant-oriented VMAs) and allow operator D to activate and/or terminate only a second group of VMAs (e.g., safety-oriented VMAs).

The ability to control and/or limit access to the VMA device 270 may be beneficial in situations where a motor vehicle may be operated by multiple-operators. In one embodiment, the VMA interface 210 may keep record of the changes made by each operator. These changes may affect the content and settings of the VMA device 270. The record may be locally stored at the interface memory 225 or remotely stored at a network storage medium. The stored record may be helpful in analyzing the driving habit of each operator, the performance of the activated VMAs, and/or the performance of various physical components of the motor vehicle. The diagnosis processor 230 may use the record to recreate an array of driving events for each operator. The array of driving events may associate the operator's input with the actual outputs delivered by the physical components of the motor vehicle. The diagnosis processor 230 may use the array of driving events to determine the level of skill of each operator and/or identify any potential issue related to the installed VMAs.

Additionally, the lock mode may allow the primary operator of a motor vehicle to monitor and/or control the driving activities of one or more groups of secondary operators. In several situations, the primary operator may be the owner and/or the manager of the motor vehicle, while the secondary operators may be one or more groups of renters and/or drivers. The primary operator may use the lock mode to mandatorily enable several VMAs disregarding the preference of the secondary operators. For example, the primary operator may mandatorily enable the collision avoidance application, so that the secondary operators will operate the vehicle with the assistance of the collision avoidance application.

The mandatorily enabled VMAs may enhance the safety features of the motor vehicle, which may in turn, reducing the risk of damaging the motor vehicle or injuring the secondary operators. This feature may be particularly beneficial to the car rental industry. Mainly, a car rental company may provide rental car to customers with various skill levels. Customers with poor driving skills or safety awareness are more likely to cause damage to the rental cars. However, it may be hard to ascertain whether a particular customer is a good driver or not.

Because the rental cars can be a major asset of a car rental company, the car rental company may like to preserve the integrity of the rental cars by ensuring that the customers will operate the rental car in a safe and prudent manner. To achieve this purpose, the car rental company may require the customers to use several safety-oriented VMAs, such as lane change assistance application and the collision avoidance application. Alternatively, the car rental company may waive such a requirement if the customers can prove that they are good drivers or if the customers are willing to pay a fee to cover the risk of causing potential damage to the car.

The lock mode may provide similar benefits to other entities. For example, parents may use the lock mode to mandatorily enable several safety-oriented VMAs for their children drivers. For another example, transportation companies, such as a bus company and a trucking company, may use the lock mode to mandatorily enable several assistance-oriented VMAs for their employee drivers.

Figure 15:
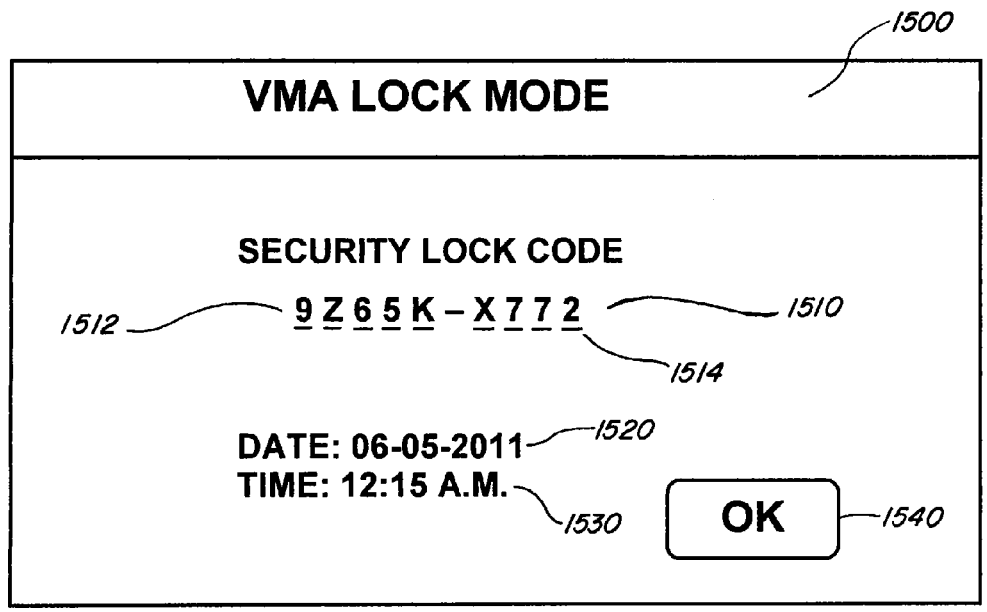
FIG. 15 shows a screen display of a VMA lock mode according to an embodiment of the present invention.

In order to initiate the lock mode, the interface processor 220 may verify the authenticity of the operator. Referring to FIG. 15, which shows a screen display of a VMA lock mode 1500, the interface processor 220 may identify each operator by accepting and processing a security lock code 1510. The security lock code 1510 may be encrypted with information regarding the identity of the associated operator and the level of access the associated operator may have. For example, the security lock code 1510 may have a first code segment 1512 and a second code segment 1514. The first code segment 1512 may be used for encrypting the identity of an operator, while the second code segment 1514 may be used for encrypting the level of access an operator may have.

To enhance the security feature of the security lock code 1510, the first code segment 1512 and/or the second code segment 1514 may be constantly, repeatedly, iteratively, and/or responsively updated by a remote server. The updated first code segment 1512 may be transmitted to the associated operator via a personal communication device, such as a remote access key fob, a personal digital assistance device, and/or a mobile phone.

The first code segment 1512 and the second code segment 1514 may be interdependent of each other. As such, the code sequence of the first code segment 1512 may contain one or more keys in decrypting the second code segment 1514. Similarly, the code sequence of the second code segment 1514 may contain one or more keys in decrypting the first code segment 1512. Alternatively, the first code segment 1512 may be independent of the second code segment 1514 so that they may each be decrypted individually. In another embodiment, the first code segment 1512 and the second code segment 1514 may be meshed, combined, and/or scrambled to form a single code segment. In yet another embodiment, the first code segment 1512 and the second code segment 1514 may be pre-assigned to the authorized operator, and it can be modified only by the authorized operator.

Figure 16:
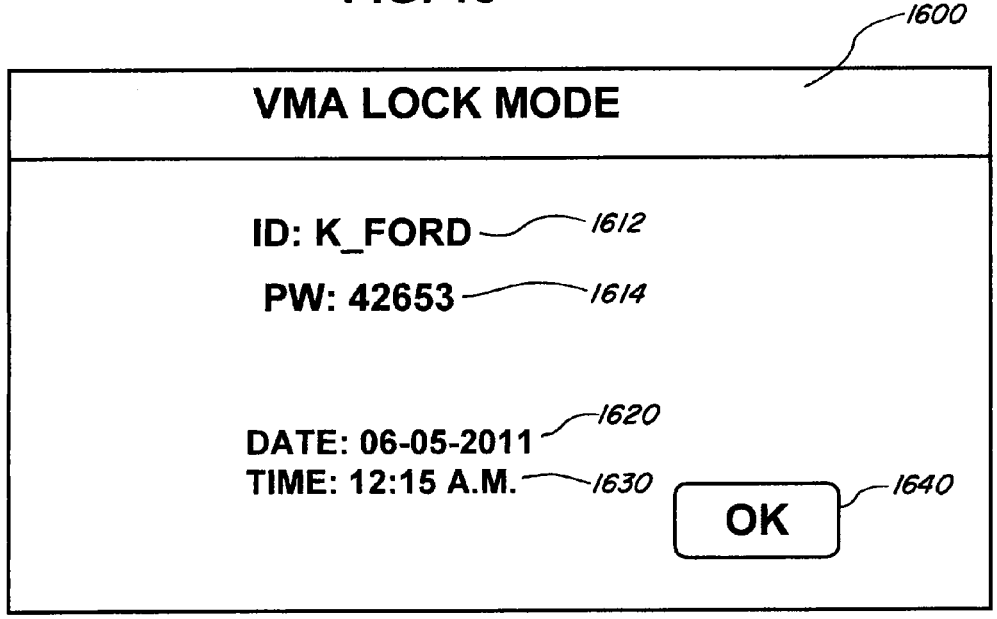
FIG. 16 shows a screen display of an alternative VMA lock mode according to an embodiment of the present invention.

Referring to FIG. 16, which shows a screen display of an alternative VMA lock mode 1600, the interface processor 220 may identify each operator by accepting and processing a user identification string 1612 in conjunction with a password 1614. The user identification string 1612 may be unique to a particular operator, and the password 1614 may be unique to the particular identification string 1612. The identification string 1612 may be pre-assigned to the operator by the interface processor 220, a local administrator, and/or a remote administrator. The password 1614 may be used for authenticating the identification string 1612. The password 1614 may be updated by a remote server and communicated to the operator iteratively, periodically, and/or responsively. Alternatively, the password 1614 may be modified by the operator.

The interface processor 220 may determine whether the password 1614 is valid by searching one or more records, which may be stored in the interface memory 225 or in a remote server. If the password is valid, the interface processor 220 may determine the level of access that is granted to the validated operator. The interface processor 220 may accept the changes that are within the level of access of the validated operator. The interface processor 220 may reject the changes that are outside the level of access of the validated operator.

In both the VMA lock mode 1500 and the alternative VMA lock mode 1600, the interface processor 220 may keep track of the date and time at which the VMA interface is locked. For example, the VMA lock mode 1500 may keep track of a security lock code date 1520 and a security lock code time 1530. For another example, the alternative lock mode 1600 may keep track of a password validation date 1620 and a password validation time 1630. The diagnosis processor 230 may use these data to time stamp the activities of various operators as well as various enabled VMAs. As such, the diagnosis processor 230 may chronologize an array of driving events based on the time stamped activities.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A non-transitory storage medium storing instructions that when executed by a processor, cause the processor to perform a method for executing and diagnosing operational issues of one or more vehicle maneuver software applications for use in a motor vehicle, the method comprising the steps of:
   providing a vehicle maneuver software application stored in a memory and having a software instruction or code for controlling a movement or an operation of the motor vehicle;
   executing, using the processor, the software instruction or code of the vehicle maneuver software application to move or operate the motor vehicle;
   collecting, from a vehicle data logger, vehicle data corresponding to an operation of at least one of a physical component of the motor vehicle or an actuating device of the motor vehicle;
   identifying, using the processor, an executed software instruction or code of the vehicle maneuver software application that corresponds to the operation of the at least one of the physical component of the motor vehicle or the actuating device of the motor vehicle; and
   automatically analyzing, using the processor, functioning or malfunctioning of an operation of the vehicle maneuver software application based on the executed software instruction or code of the vehicle maneuver software application and the collected vehicle data.

2. The non-transitory storage medium of claim 1, further comprising installing the vehicle maneuver software application, wherein the installing step includes the steps of:
   verifying the received vehicle maneuver software application,
   checking the memory for available memory space, and
   storing the verified vehicle maneuver software application in the memory.

3. The non-transitory storage medium of claim 2, wherein the verifying step includes the steps of:
   determining whether the received vehicle maneuver software application is certified, and
   determining whether the received vehicle maneuver software application is compatible with a vehicle maneuver controller.

4. The non-transitory storage medium of claim 1, wherein the vehicle maneuver software application is received from a vehicle maneuver software application source that is selected from a group consisting of a FLASH memory card, a USB drive, a CD, a hard disk, a remote server, a cell phone, an online store, and combinations thereof.

5. The non-transitory storage medium of claim 1, further storing instructions that when executed by the processor, cause the processor to perform a method comprising the steps of:
   detecting an update signal; and
   in response to the detected update signal, updating the stored vehicle maneuver software application.

6. The non-transitory storage medium of claim 5, wherein the updating step includes the steps of:
   receiving a vehicle maneuver software application modification from a vehicle maneuver software application source,
   verifying the received vehicle maneuver software application modification,
   checking the memory for available space, and
   updating a target vehicle maneuver software application based on the verified vehicle maneuver software application modification.

7. The non-transitory storage medium of claim 6, wherein the verifying step includes the steps of:
   identifying the target vehicle maneuver software application to be updated,
   determining whether the received vehicle maneuver software application modification is certified, and
   determining whether the received vehicle maneuver software application modification is compatible with a vehicle maneuver controller.

8. The non-transitory storage medium of claim 1, further comprising:
   detecting an uninstallation signal; and
   in response to the detected uninstallation signal, uninstalling the stored vehicle maneuver software application.

9. The non-transitory storage medium of claim 8, wherein the uninstalling step includes the steps of:
   receiving a selection of a vehicle maneuver software application to be uninstalled,
   locating a target vehicle maneuver software application based on the received selection,
   analyzing an impact of uninstalling the selected vehicle maneuver software application, and
   removing the selected vehicle maneuver software application from the memory if the impact is below a predefined threshold.

10. The non-transitory storage medium of claim 9, wherein the analyzing the impact of uninstalling the selected vehicle maneuver software application includes the steps of:
    determining a stability of the motor vehicle, and
    determining integrity of one or more unselected vehicle maneuver software application.

11. The non-transitory storage medium of claim 1, further comprising:
    detecting a vehicle maneuver software application activation signal; and
    in response to the detected vehicle maneuver software application activation signal, activating the stored vehicle maneuver software application.

12. The non-transitory storage medium of claim 11, wherein the activating step includes the steps of:
    receiving a selection of a vehicle maneuver software application to be activated;
    initializing the selected vehicle maneuver software application; and
    interfacing the initialized vehicle maneuver software application with a vehicle maneuver controller, the vehicle maneuver controller configured to control a movement of the motor vehicle.

13. The non-transitory storage medium of claim 12, wherein the interfacing step includes the steps of:
    establishing a connection between the initiated vehicle maneuver software application and the vehicle maneuver controller, thereby allowing the initiated vehicle maneuver software application to control the vehicle maneuver controller,
suspending the connection upon receiving an interrupt signal, and
resuming the suspended connection upon receiving a resume signal.

14. The non-transitory storage medium of claim 12, wherein the interfacing step includes the steps of:
establishing a connection between the initiated vehicle maneuver software application and the vehicle maneuver controller, thereby allowing the initiated vehicle maneuver software application to control the vehicle maneuver controller,
terminating the connection upon receiving a termination signal, and
diagnosing the motor vehicle.

15. A non-transitory storage medium storing instructions that when executed by a processor, cause the processor to perform a method for executing and diagnosing operational issues of one or more vehicle maneuver software applications for use in a motor vehicle, the method comprising the steps of:
providing a vehicle maneuver software application stored in a memory and having a software instruction or code for controlling a movement or an operation of the motor vehicle;
providing a vehicle maneuver controller configured to control a movement of the motor vehicle based on the software instruction or code of the vehicle maneuver software application;
detecting an activation signal for activating the vehicle maneuver software application;
in response to the detected activation signal, selecting the vehicle maneuver software application to be activated;
initializing the selected vehicle maneuver software application;
interfacing the initialized vehicle maneuver software application with the vehicle maneuver controller for controlling the movement of the motor vehicle;
executing, using the processor, the software instruction or code of the vehicle maneuver software application to move or operate the motor vehicle;
collecting vehicle data from a vehicle data logger, the vehicle data containing information related to an operation of at least one of a physical component of the motor vehicle or an actuating device of the motor vehicle;
identifying, using the processor, an executed software instruction or code of the vehicle maneuver software application that corresponds to the operation of the at least one of the physical component of the motor vehicle or the actuating device of the motor vehicle; and
analyzing, using the processor, functioning or malfunctioning of an operation of the vehicle maneuver software application based on the executed software instruction or code of the vehicle maneuver software application and the collected vehicle data.

16. The non-transitory storage medium of claim 15, wherein the interfacing step includes the steps of:
establishing a connection between the initiated vehicle maneuver software application and the vehicle maneuver controller, thereby allowing the initiated vehicle maneuver software application to control the vehicle maneuver controller,
suspending the connection upon receiving an interrupt signal, and
resuming the suspended connection upon receiving a resume signal.

17. The non-transitory storage medium of claim 15, wherein the interfacing step includes the steps of:
establishing a connection between the initiated vehicle maneuver software application and the vehicle maneuver controller, thereby allowing the initiated vehicle maneuver software application to control the vehicle maneuver controller,
terminating the initiated vehicle maneuver software application and the connection upon receiving a termination signal, and
diagnosing a driving incident of the motor vehicle based on the analyzed function or malfunctioning of the operation of the vehicle maneuver software application.

18. A vehicle maneuver application system for use in a motor vehicle, comprising:
a vehicle maneuver device configured to store and execute a vehicle maneuver software application having a software instruction or code for controlling a movement or an operation of the motor vehicle;
a processor coupled to the vehicle maneuver device, the processor configured to execute the software instruction or code of the vehicle maneuver software application to move or operate the motor vehicle;
a vehicle maneuver controller coupled to the interface processor, the vehicle maneuver controller configured to control the movement of the motor vehicle based on the executed software instruction or code of the vehicle maneuver software application;
a sensor configured to sense a condition of the motor vehicle; and
a vehicle data logger coupled to the sensor, the vehicle data logger configured to store vehicle data recording the sensed condition, wherein the processor is configured to analyze functioning or malfunctioning of an operation of the vehicle maneuver software application based on the executed software instruction or code of the vehicle maneuver software application and the collected vehicle data.

19. The VMA system of claim 18, further comprising:
a memory coupled to the processor, the memory configured to store a vehicle maneuver application execution record related to the vehicle maneuver application.

20. The vehicle maneuver application system of claim 19, wherein the processor is coupled to the memory, and the processor is configured to identify a driving incident and determine a cause of the identified driving incident based on the collected vehicle data and the vehicle maneuver application execution record.

21. A non-transitory storage medium storing instructions that when executed by a processor, cause the processor to perform a method for handling one or more vehicle maneuver applications (VMA) for use in a motor vehicle, the method comprising the steps of:
initiating a VMA device;
detecting an installation signal;
receiving a VMA from a VMA source;
in response to the detected installation signal, installing the received VMA in a memory configured to be coupled to the processor;
detecting an uninstallation signal;
in response to the detected uninstallation signal, uninstalling the stored VMA;
receiving a selection of a VMA to be uninstalled;
locating a target VMA based on the received selection;
analyzing an impact of uninstalling the selected VMA; and
removing the selected VMA from the memory if the impact is below a predefined threshold.

22. The non-transitory storage medium of claim 21, wherein the analyzing step includes the steps of:
   determining a stability of the motor vehicle, and
   determining integrity of one or more unselected VMAs.

* * * * *